United States Patent
Xiong

(10) Patent No.: US 12,477,306 B2
(45) Date of Patent: Nov. 18, 2025

(54) COMMUNICATION METHOD AND APPARATUS FOR MULTICAST AND BROADCAST SERVICE, MEDIUM, AND ELECTRONIC DEVICE

(71) Applicant: Tencent Technology (Shenzhen) Company Limited, Shenzhen (CN)

(72) Inventor: Chunshan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 440 days.

(21) Appl. No.: 17/985,784

(22) Filed: Nov. 11, 2022

(65) Prior Publication Data
US 2023/0083175 A1  Mar. 16, 2023

Related U.S. Application Data

(63) Continuation of application No. PCT/CN2021/132946, filed on Nov. 25, 2021.

(30) Foreign Application Priority Data

Feb. 10, 2021 (CN) .......................... 202110184915.2

(51) Int. Cl.
 *H04W 4/06* (2009.01)
 *H04L 12/18* (2006.01)
(52) U.S. Cl.
 CPC ............. *H04W 4/06* (2013.01); *H04L 12/189* (2013.01)
(58) Field of Classification Search
 CPC ............................... H04W 4/06; H04L 12/189
 See application file for complete search history.

(56) References Cited

U.S. PATENT DOCUMENTS

| | | | |
|---|---|---|---|
| 2019/0158985 A1* | 5/2019 | Dao | H04W 28/04 |
| 2019/0223250 A1* | 7/2019 | Dao | H04W 72/23 |
| 2020/0351984 A1 | 11/2020 | Talebi Fard et al. | |
| 2023/0055967 A1 | 2/2023 | Zhang | |
| 2023/0379942 A1* | 11/2023 | Kim | H04W 36/0007 |

FOREIGN PATENT DOCUMENTS

| | | |
|---|---|---|
| CN | 1845527 A | 10/2006 |
| CN | 109951824 A | 6/2019 |

(Continued)

OTHER PUBLICATIONS

3GPP, "3rd Generation Partnership Project; Technical Specification Group Services and System Aspects; Procedures for the 5G System (SGS); Stage 2 (Release 16)", TS 23.502 V16.7.1, Jan. 2021, 13 pgs.

(Continued)

*Primary Examiner* — Michael A Keller
(74) *Attorney, Agent, or Firm* — Morgan, Lewis & Bockius LLP

(57) ABSTRACT

This application provide a communication method for a multicast and broadcast service (MBS) performed by an electronic device. The method includes: receiving a data management creation/update request transmitted by a network exposure function, the request including a data set identifier used for indicating a user equipment policy, a data subset identifier used for indicating that a data type is an MBS service, a data keyword used for indicating a multicast/broadcast address, a data sub-keyword used for indicating network slice information and a data network name or used for indicating an MBS session identifier, and a data set used for indicating MBS service data; transmitting a DM creation/update response to the NEF; and transmitting a DM notification request to a policy control function, the DM notification request being used for causing the PCF to transmit, to the UE, policy information of which a UE policy type is an MBS service.

20 Claims, 13 Drawing Sheets

(56) References Cited

FOREIGN PATENT DOCUMENTS

| CN | 110650467 | A | 1/2020 |
| CN | 111491346 | A | 8/2020 |
| CN | 111526552 | A | 8/2020 |
| CN | 111526553 | A | 8/2020 |
| CN | 111556539 | A | 8/2020 |
| CN | 112073919 | A | 12/2020 |
| CN | 112954615 | A | 6/2021 |

OTHER PUBLICATIONS

Tencent, "S2-2003986" KI #1, Sol #14: Update MBS Session Management Procedure, SA WG2 Meeting #141E, Oct. 23, 2020, 8 pgs.

Tencent Technology, ISR, PCT/CN2021/132946, Jan. 29, 2022, 3 pgs.

Huawei et al., "New Architecture for MBS", Document: S2-2005409, 3rd Generation Partnership Project (3GPP), TSG-WG SA2 Meeting #140E, Elbonia, Aug. 19-Sep. 1, 2020, 6 pgs., Retrieved from the Internet: https://ftp.3gpp.org/tsg_sa/WG2_Arch/T.

Juniper Networks et al., "Alignment on the Use of Terminologies for Deliver Methods" Document: S2-2004162, 3rd Generation Partnership Project (3GPP), SA WG2 Meeting #S2-139e, Jun. 1-20, 2022, 23 pgs., Retrieved from the Internet: https://ftp.3gpp.org/tsg_sa/WG2_Arch/T.

Tencent Technology, Extended European Search Report, EP Patent Application No. 21925464.6, Mar. 11, 2024, 10 pgs.

Tencent Technology, WO, PCT/CN2021/132946, Jan. 29, 2022, 5 pgs.

Tencent Technology, IPRP, PCT/CN2021/132946, Aug. 15, 2023, 6 pgs.

\* cited by examiner

COMMUNICATION METHOD AND APPARATUS FOR MULTICAST AND BROADCAST SERVICE, MEDIUM, AND ELECTRONIC DEVICE

CROSS-REFERENCE TO RELATED APPLICATIONS

This application is a continuation application of PCT Patent Application No. PCT/CN2021/132946, entitled "COMMUNICATION METHOD AND APPARATUS FOR MULTICAST AND BROADCAST SERVICE, AND MEDIUM AND ELECTRONIC DEVICE" filed on Nov. 25, 2021, which claims priority to Chinese Patent Application No. 202110184915.2, filed with the State Intellectual Property Office of the People's Republic of China on Feb. 10, 2021, and entitled "COMMUNICATION METHOD AND APPARATUS FOR MULTICAST AND BROADCAST SERVICE, MEDIUM, AND ELECTRONIC DEVICE", all of which are incorporated herein by reference in their entirety.

FIELD OF THE TECHNOLOGY

This application relates to the field of computer and communication technologies, and specifically, to a multicast and broadcast service (MBS).

BACKGROUND OF THE DISCLOSURE

MBS services include multicast services and broadcast services, and specifically, are all transmitting same content to a plurality of recipients. However, how to ensure that user equipment (UE) serving as a recipient obtains MBS service information, to join a corresponding MBS session for multicast/broadcast communication, is a technical problem that urgently needs to be resolved.

SUMMARY

Embodiments of this application provide a communication method and apparatus for an MBS, a medium, and an electronic device, to transmit MBS service information to UE in a standardized mode at least to some extent, thereby reducing development costs and testing costs of the UE.

Other features and advantages of this application become obvious through the following detailed descriptions, or may be partially learned through the practice of this application.

According to an aspect of the embodiments of this application, a communication method for an MBS is performed by an electronic device acting as a unified data repository for an MBS (MBS UDR), the method including: receiving a data management (DM) creation/update request transmitted by a network exposure function (NEF), the DM creation/update request including a data set identifier used for indicating a UE policy, a data subset identifier used for indicating that a data type is an MBS service, a data keyword used for indicating a multicast/broadcast address, a data sub-keyword used for indicating network slice information and a data network name or used for indicating an MBS session identifier, and a data set used for indicating MBS service data, and the DM creation/update request being transmitted by the NEF after an MBS service creation/update request transmitted by an application function (AF) is received; transmitting a DM creation/update response to the NEF based on the DM creation/update request; and transmitting, after receiving a DM subscription request transmitted by a policy control function (PCF) and returning a DM subscription response to the PCF, a DM notification request to the PCF, the DM notification request including a data set identifier used for indicating a UE policy, a data subset identifier used for indicating that a data type is an MBS service, a data set used for indicating MBS service data, a data keyword used for indicating a multicast/broadcast address, a data sub-keyword used for indicating network slice information and a data network name, and the DM notification request being used for causing the PCF to transmit, to UE, UE policy information of which a UE policy type is an MBS service.

According to an aspect of the embodiments of this application, a communication method for an MBS is performed by an electronic device acting as a policy control function (PCF), the method including: generating a DM subscription request, the DM subscription request including a subscription permanent identifier, a data set identifier used for indicating a UE policy, a data subset identifier used for indicating that a data type is an MBS service, a notification target address, and a notification correlation identifier; transmitting, after it is detected that UE registers with a network, the DM subscription request to a unified data repository for an MBS (MBS UDR), and receiving a DM subscription response fed back by the MBS UDR; receiving, after receiving the DM subscription response fed back by the MBS UDR, a DM notification request transmitted by the MBS UDR, the DM notification request including a data set identifier used for indicating a UE policy, a data subset identifier used for indicating that a data type is an MBS service, a data set used for indicating MBS service data, a data keyword used for indicating a multicast/broadcast address, and a data sub-keyword used for indicating network slice information and a data network name; and transmitting, to UE according to the DM notification request, UE policy information of which a UE policy type is an MBS service.

According to an aspect of the embodiments of this application, a communication method for an MBS is performed by an electronic device acting as a network exposure function (NEF), the method including: receiving an MBS service creation/update request transmitted by an AF, the MBS service creation/update request including a multicast/broadcast address, network slice information, a data network name, and MBS service data; generating a DM creation/update request, the DM creation/update request including a data set identifier used for indicating a UE policy, a data subset identifier used for indicating that a data type is an MBS service, a data keyword used for indicating a multicast/broadcast address, a data sub-keyword used for indicating network slice information and a data network name or used for indicating an MBS session identifier, and a data set used for indicating MBS service data; and transmitting the DM creation/update request to an MBS UDR, and returning an MBS service creation/update response to the AF.

According to an aspect of the embodiments of this application, a communication method for an MBS is performed by an electronic device acting as an application function (AF), the method including: generating an MBS service creation/update request, the MBS service creation/update request including a multicast/broadcast address, network slice information, a data network name, and MBS service data; transmitting the MBS service creation/update request to a NEF, the MBS service creation/update request being used for triggering the NEF to transmit a DM creation/update request to an MBS UDR, the DM creation/update request including a data set identifier used for indicating a UE policy, a data subset identifier used for indicating that a data type is an MBS service, a data keyword used for indicating a multicast/broadcast address, a data sub-keyword used for indicating network slice information and a data network name or used for indicating an MBS session identifier, a data set used for indicating MBS service data, and a set of subscription permanent identifiers participating in MBS communication; and receiving an MBS service creation/update response fed back by the NEF, the MBS service creation/update response being transmitted by the NEF after a DM creation/update response fed back by the MBS UDR is received.

According to an aspect of the embodiments of this application, a communication method for an MBS is performed by an electronic device acting as an user equipment (UE), the method including: a fifth receiving unit, configured to receive a downlink UE policy management instruction transmitted by a PCF, a UE policy type included in the UE policy management instruction being an MBS service, a UE policy included in the UE policy management instruction including MBS service data, a multicast/broadcast address, network slice information, and a data network name, the downlink UE policy management instruction being transmitted by the PCF to an access and mobility management function (AMF) and being transmitted by the AMF to UE through a downlink non-access stratum transport message; transmit uplink UE policy management completion information to the PCF, the uplink UE policy management completion information being transmitted by the UE to the AMF through an uplink non-access stratum transport message and being transmitted by the AMF to the PCF; and join, according to information included in the UE policy management instruction, a corresponding MBS session for multicast/broadcast communication.

According to an aspect of the embodiments of this application, a communication apparatus for an MBS is an electronic device acting as a unified data repository for an MBS (MBS UDR), including: a first receiving unit, configured to receive a DM creation/update request transmitted by a NEF, the DM creation/update request including a data set identifier used for indicating a UE policy, a data subset identifier used for indicating that a data type is an MBS service, a data keyword used for indicating a multicast/broadcast address, a data sub-keyword used for indicating network slice information and a data network name or used for indicating an MBS session identifier, and a data set used for indicating MBS service data, and the DM creation/update request being transmitted by the NEF after an MBS service creation/update request transmitted by an AF is received; a first transmitting unit, configured to transmit a DM creation/update response to the NEF based on the DM creation/update request; and a first processing unit, configured to transmit, after receiving a DM subscription request transmitted by a PCF and returning a DM subscription response to the PCF, a DM notification request to the PCF, the DM notification request including a data set identifier used for indicating a UE policy, a data subset identifier used for indicating that a data type is an MBS service, a data set used for indicating MBS service data, a data keyword used for indicating a multicast/broadcast address, a data sub-keyword used for indicating network slice information and a data network name, and the DM notification request being used for causing the PCF to transmit, to UE, UE policy information of which a UE policy type is an MBS service.

According to an aspect of the embodiments of this application, a communication apparatus for an MBS is an electronic device acting as a policy control function (PCF), including: a first generation unit, configured to generate a DM subscription request, the DM subscription request including a subscription permanent identifier, a data set identifier used for indicating a UE policy, a data subset identifier used for indicating that a data type is an MBS service, a notification target address, and a notification correlation identifier; an interaction unit, configured to transmit, after it is detected that UE registers with a network, the DM subscription request to an MBS UDR, and receive a DM subscription response fed back by the MBS UDR; a second receiving unit, configured to receive, after receiving the DM subscription response fed back by the MBS UDR, a DM notification request transmitted by the MBS UDR, the DM notification request including a data set identifier used for indicating a UE policy, a data subset identifier used for indicating that a data type is an MBS service, a data set used for indicating MBS service data, a data keyword used for indicating a multicast/broadcast address, and a data sub-keyword used for indicating network slice information and a data network name; and a second transmitting unit, configured to transmit, to UE according to the DM notification request, UE policy information of which a UE policy type is an MBS service.

According to an aspect of the embodiments of this application, a communication apparatus for an MBS is an electronic device acting as a network exposure function (NEF), including: a third receiving unit, configured to receive an MBS service creation/update request transmitted by an AF, the MBS service creation/update request including a multicast/broadcast address, network slice information, a data network name, and MBS service data; a second generation unit, configured to generate a DM creation/update request, the DM creation/update request including a data set identifier used for indicating a UE policy, a data subset identifier used for indicating that a data type is an MBS service, a data keyword used for indicating a multicast/broadcast address, a data sub-keyword used for indicating network slice information and a data network name or used for indicating an MBS session identifier, and a data set used for indicating MBS service data; and a third transmitting unit, configured to transmit the DM creation/update request to an MBS UDR, and return an MBS service creation/update response to the AF.

According to an aspect of the embodiments of this application, a communication apparatus for an MBS is an electronic device acting as an application function (AF), including: a third generation unit, configured to generate an MBS service creation/update request, the MBS service creation/update request including a multicast/broadcast address, network slice information, a data network name, and MBS service data; a fourth transmitting unit, configured to transmit the MBS service creation/update request to a NEF, the MBS service creation/update request being used for triggering the NEF to transmit a DM creation/update request to an MBS UDR, the DM creation/update request including a data set identifier used for indicating a UE policy, a data subset identifier used for indicating that a data type is an MBS service, a data keyword used for indicating a multicast/broadcast address, a data sub-keyword used for indicating network slice information and a data network name or used for indicating an MBS session identifier, a data set used for indicating MBS service data, and a set of subscription permanent identifiers participating in MBS communication; and a fourth receiving unit, configured to receive an MBS service creation/update response fed back by the NEF, the MBS service creation/update response being transmitted by the NEF after a DM creation/update response fed back by the MBS UDR is received.

According to an aspect of the embodiments of this application, a non-transitory computer-readable medium is provided, storing one or more computer programs, the computer programs, when executed by a processor of an electronic device, causing the electronic device to implement the communication method for an MBS described in the foregoing aspects.

According to an aspect of the embodiments of this application, an electronic device is provided, including: one or more processors; a storage apparatus, configured to store one or more programs, the one or more programs, when executed by the one or more processors, causing the electronic device to implement the communication method for an MBS described in the foregoing aspects.

According to an aspect of the embodiments of this application, a computer program product or a computer program is provided. The computer program product or the computer program includes computer instructions, and the computer instructions are stored in a computer-readable storage medium. A processor of a computer device reads the computer instructions from the computer-readable storage medium. The processor executes the computer instructions, to cause the computer device to perform the communication method for an MBS described in the foregoing aspects.

In the technical solutions provided in some embodiments of this application, notification of information about an MBS service is performed based on a UE policy, so that the MBS service information can be transmitted to UE in a standardized mode, thereby reducing development costs and testing costs of the UE.

DESCRIPTION OF EMBODIMENTS

The term "a plurality of" mentioned in this application means two or more. The term "and/or" describes only an association relationship between associated objects and represents that three relationships may exist. For example, A and/or B may represent the following three cases: Only A exists, both A and B exist, and only B exists. The character "/" generally indicates an "or" relationship between associated objects.

Figure 1:
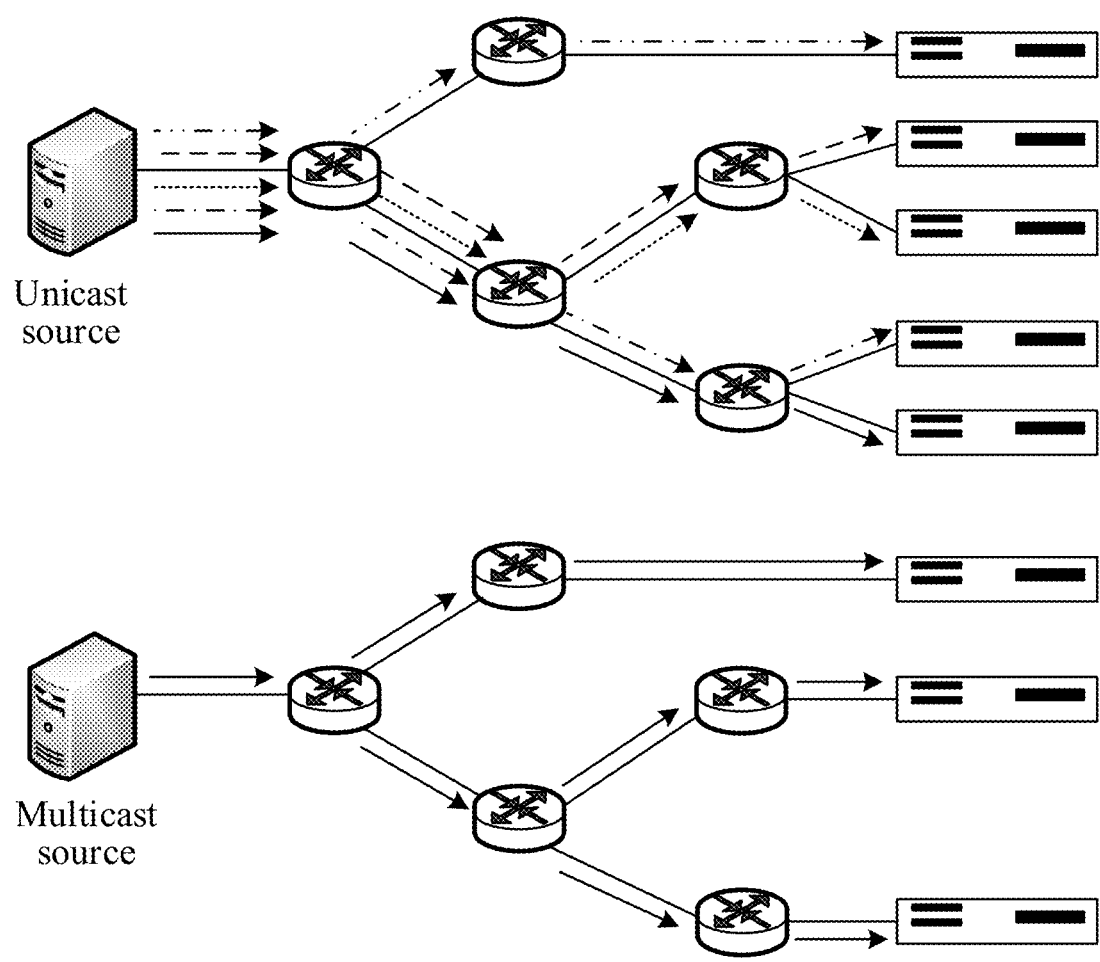
FIG. 1 is a schematic flowchart of data transfer of a unicast communication system and a multicast communication system.

Modes of communication between network nodes mainly include unicast, multicast, and broadcast. "Unicast" is the most common one-to-one communication, and an advantage thereof is that a sender can transmit different content to different recipients. However, if the sender needs to transmit the same content to a plurality of recipients, a plurality of copies of the same data need to be transmitted end-to-end respectively, resulting in low efficiency. Specifically, as shown in FIG. 1, when sending data to a plurality of recipients in a unicast mode, a unicast source needs to transmit a plurality of copies of the same data in an end-to-end mode respectively (different line types in FIG. 1 represent different data flows).

"Multicast" means that a sender transmits the same content to a plurality of recipients. The use of the multicast mode is particularly suitable for the online video conference and the online video-on-demand because if the unicast mode is adopted, there are as many transmission procedures as there are recipients. Obviously, such a mode has extremely low efficiency. However, in the broadcast mode in which transmission is performed to all targets without distinguishing the targets, although data can be completely transmitted at a time, particular data recipients cannot be distinguished. In view of the above, in the multicast mode, not only the same data can be sent to a plurality of recipients at a time, but also the objective of transmitting data only to particular objects can be achieved. Specifically, as shown in FIG. 1, a multicast source can send the same data to a plurality of recipients at a time.

"Broadcast" also means transmitting the same content to a plurality of recipients, but no recipient selection is made during transmission. As a result, data may also be transmitted to an unnecessary device, resulting in a waste of network resources. In addition, some recipients may not be "interested" in the broadcast content, and have to discard received data packets after receiving the broadcast content, resulting in a waste of terminal resources.

The broadcast service essentially differs from the multicast service in that all UEs in the system can participate in the broadcast service without subscription, while the UE can participate in the multicast service only after subscription and authentication. In addition, there are many types of multicast services and broadcast services. For the multicast service, the UE joins a multicast group of a corresponding service through a multicast IP address. A broadcast service corresponding to a broadcast group has its specific service region.

Figure 2:
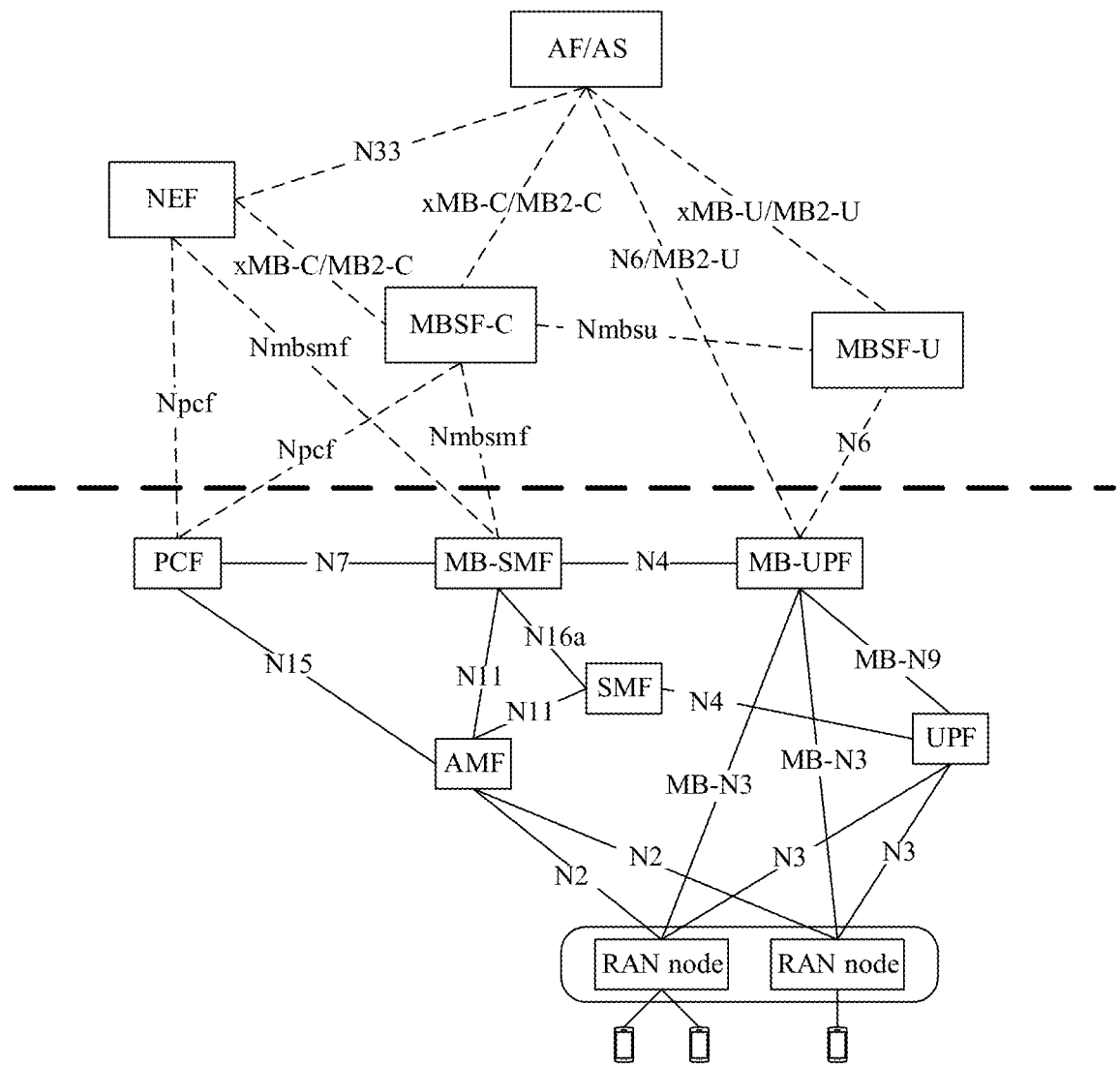
FIG. 2 is a schematic architectural diagram of a 5G MBS system.

An architecture of a 5G MBS system is shown in FIG. 2, including an AF/application server (AS), a NEF, a multicast/broadcast service function-control plane (MBSF-C), a multicast/broadcast service function-user plane (MBSF-U), a PCF, multicast/broadcast-SMF (MB-SMF), multicast/broadcast-UPF (MB-UPF), an SMF, an AMF, a user plane function (UPF), a radio access network (RAN) node, and UE connected to the RAN node.

In the embodiment shown in FIG. 2, Npcf refers to an interface through which the PCF provides a service. Another network function (NF) sends an Npcf service request message to the PCF through this interface, and in addition, through this interface, the PCF replies to the request and sends and notifies a service message. Nmbsmf refers to an interface through which the MB-SMF provides a service. Another NF sends an Nmbsmf service request message to the MB-SMF through this interface, and in addition, through this interface, the MB-SMF replies to the request and sends and notifies a service message.

In addition, the AMF interacts with the RAN node through an N2 interface. The UPF interacts with the RAN node through an N3 interface. The SMF interacts with the UPF through an N4 interface. The SMF interacts with the AMF through an N11 interface. The MB-UPF interacts with the RAN node through an MB-N3 interface. The MB-SMF interacts with the AMF through an N11 interface. The MB-SMF interacts with the SMF through an N16a interface. The PCF interacts with the AMF through an N15 interface. The PCF interacts with the MB-SMF through an N7 interface. The MB-SMF interacts with the MB-UPF through an N4 interface. The MB-UPF interacts with the MBSF-U through an N6 interface. The MB-UPF interacts with the AF/AS through an N6/MB2-U interface. The MBSF-U interacts with the AF/AS through an xMB-U/MB2-U interface. The MBSF-C interacts with the AF/AS through an xMB-C/MB2-C interface. The MBSF-C interacts with the NEF through an xMB-C/MB2-C interface. The NEF interacts with the AF/AS through an N33 interface.

In the system architecture shown in FIG. 2, the MBSF-C and the MBSF-U are not necessary, but the MBSF-C and the MBSF-U are necessary under the following two conditions: 1. The 5G MBS service and the 4G or 3G multimedia broadcast and multicast Service (MBMS) service are interconnected, that is, when the 5G AF and the 4G or 3G MBMS AS are the same entity. 2. The operator needs to perform processing on the MBS service (processing such as transcoding the video or checking the content).

A 5G MBS multicast address or broadcast address is actually equivalent to a TV channel. However, for a TV channel that plays different program content at different times, the user needs to know in advance which "TV channels (that is, multicast addresses or broadcast addresses)" are available and what different programs each "TV channel" has at what moment, that is, start and end times of the program, content of the program, and the like. For the user, it is necessary to "discover" which TV channels are available, programs of each TV channel, and broadcast times of the programs of the TV channel. Moreover, the service provider needs to notify which TV channels are provided, as well as program content and broadcast times of programs of each TV channel, and in addition, needs to consider how to notify the information.

Similarly, for the 5G MBS, not every multicast address or broadcast address has data to transmit 24 hours a day. Therefore, it is more necessary for the UE to learn of the start and end times of the service. Specifically, the UE needs to obtain service information of the 5G MBS. The service information includes a start time and an end time of the service. The UE can join an MBS multicast group corresponding to the service some time before (for example, a few minutes before) the service starts, thereby avoiding consumption of the UE power caused by untimely joining an MBS multicast group and signaling and procedures for an unnecessary handover between a RAN that supports the MBS and a RAN that does not support the MBS. Obviously, the joining after the program starts also has the previous advantages, but the program content has been played, and the user misses the beginning of the program. Therefore, that the UE obtains service information of the 5G MBS is an optimization technology for the UE to join an MBS multicast session or broadcast session.

In addition, the standard specifies several forms of the UE policy (UE policy) in the 5G system, specifically including: a UE route selection policy (UURSP), an access network discovery and selection policy (ANDDSP), and UE policies for V2X (V2XP). V2X is Vehicle to Everything, and its Chinese meaning is that a vehicle communicates with the outside world.

Figure 3:
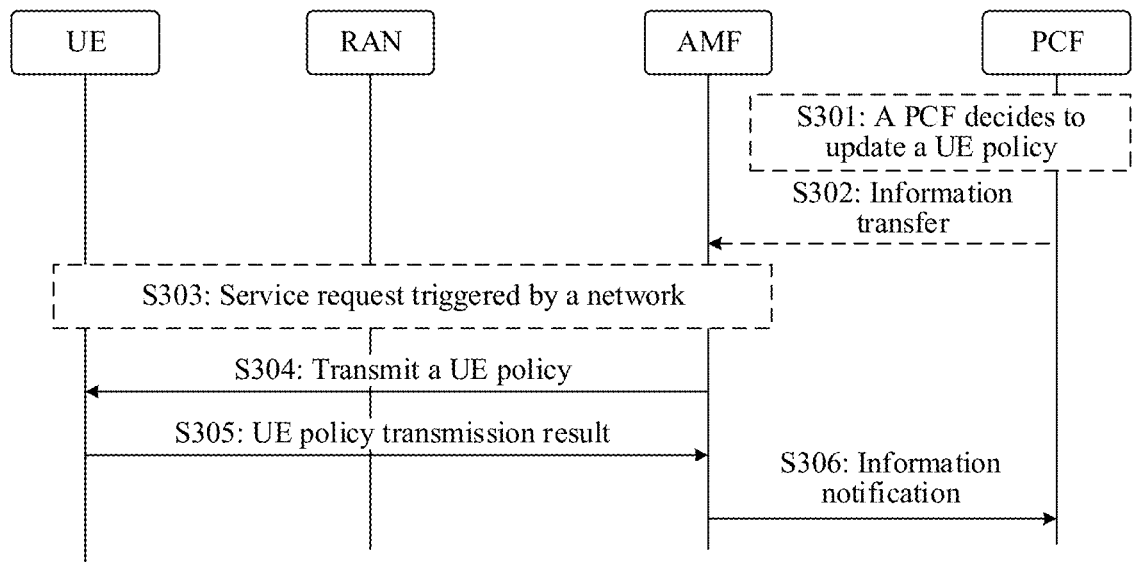
FIG. 3 is a schematic diagram of a transmission procedure of a UE policy.

As shown in FIG. 3, the UE configuration update procedure for transparent UE policy delivery in the 5G standard partially provides the overall procedure of UE policy transmission, specifically including the following steps:

S301: A PCF decides to update a UE policy.

S302: The PCF performs information transfer to an AMF, that is, sends an Namf_Communication_N1N2MessageTransfer message.

S303: A network triggers a service request.

S304: The AMF transmits a UE policy to UE through a RAN, that is, the AMF performs downlink non-access stratum transport (DL NAS transport), including a UE policy container.

S305: The UE feeds back a UE policy transmission result to the AMF through the RAN, that is, the UE performs uplink non-access stratum transport (UL NAS transport), including the UE policy container.

S306: The AMF feeds back an information notification (that is, sends an Namf_Communication_N1MessageNotify message) to the PCF, to notify a UE policy update result.

Figure 4:
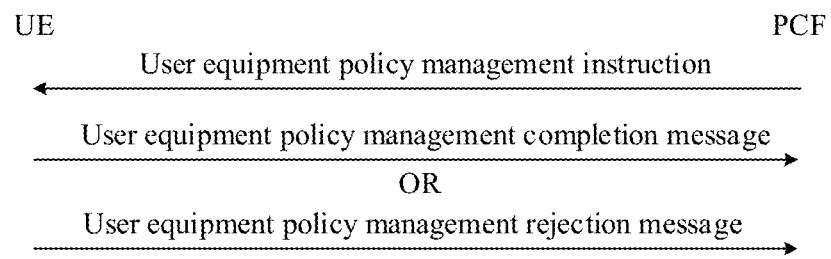
FIG. 4 and FIG. 5 are schematic diagrams of two modes of exchanging information between UE and a PCF.
Figure 5:
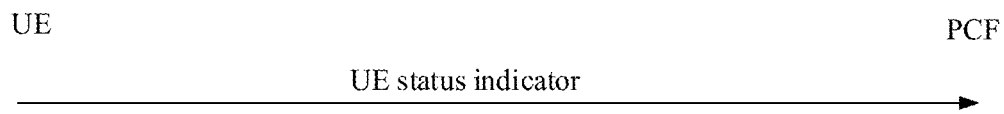

In addition, the part Annex D in the standard provides several modes of exchanging information between UE and a PCF. Details are shown in FIG. 4 and FIG. 5. In FIG. 4, the PCF sends a UE policy management instruction (that is, Manage UE Policy Command) to the UE, and after receiving the UE policy management instruction, the UE feeds back a UE policy management completion message (that is, Manage UE Policy Complete) to the PCF, or the UE feeds back a UE policy management instruction rejection message (that is, Manage UE Policy Command Reject) to the PCF. In FIG. 5, the UE sends a UE status indicator to the PCF.

Figure 6:
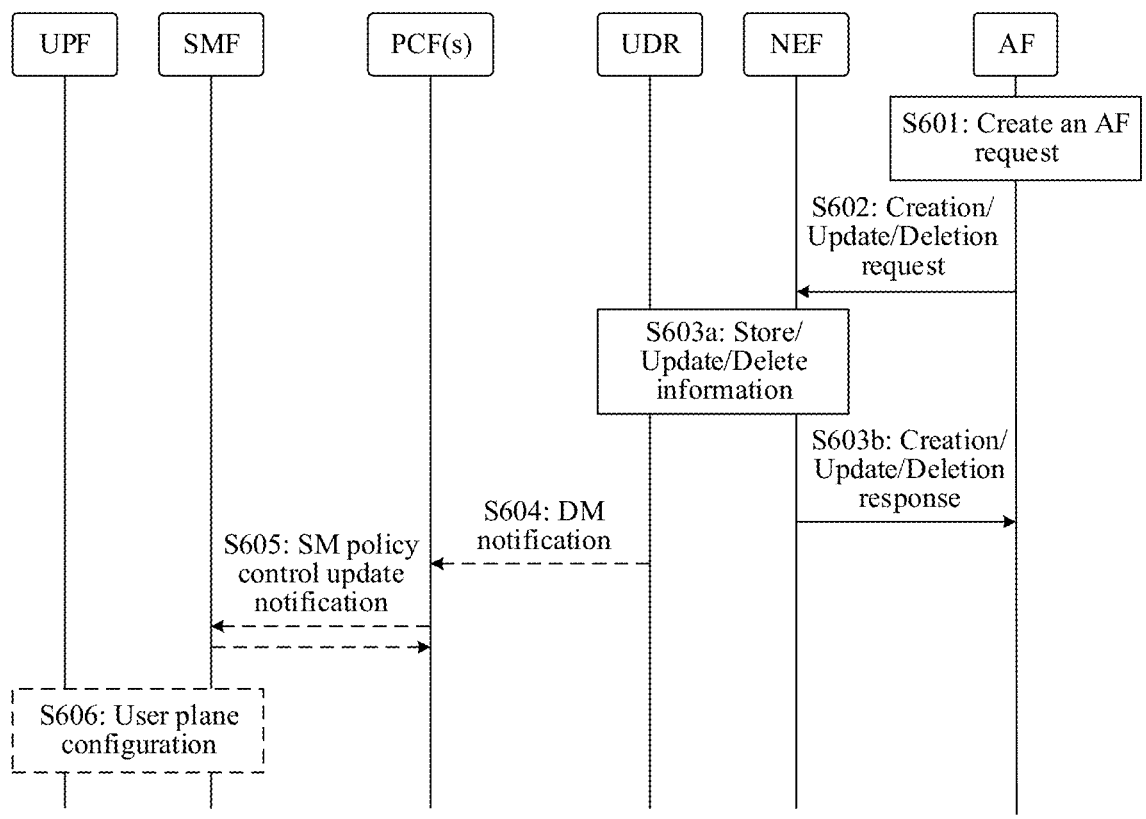
FIG. 6 is a flowchart of processing an AF request to affect traffic routing of a session not identified by a UE address.

The standard provides a relevant chapter or section of a procedure in which the AF transfers some information to the PCF, for example, processing an AF request to affect traffic routing of a session not identified by a UE address, as shown in FIG. 6, including the following steps:

S601: An AF creates an AF request. Specifically, the AF calls an Nnef_TrafficInfluence_Create service to create the AF request.

S602: The AF transmits a creation/update/deletion request, that is, Nnef_TrafficInfluence_Create/Update/Delete Request, to a NEF.

S603a: The NEF stores/updates/deletes information in a UDR according to the creation/update/deletion request sent by the AF.

S603b: The NEF transmits a creation/update/deletion response, that is, Nnef_TrafficInfluence_Create/Update/Delete Response, to the AF.

S604: The UDR transmits a DM notification to a PCF.

S605: Perform notification of an SM policy control update between the PCF and an SMF.

S606: Perform a user plane configuration procedure between the SMF and a UPF.

For other details of the steps in FIG. 6, reference may be made to the relevant part of processing an AF request to affect traffic routing of a session not identified by a UE address in the standard.

Figure 7:
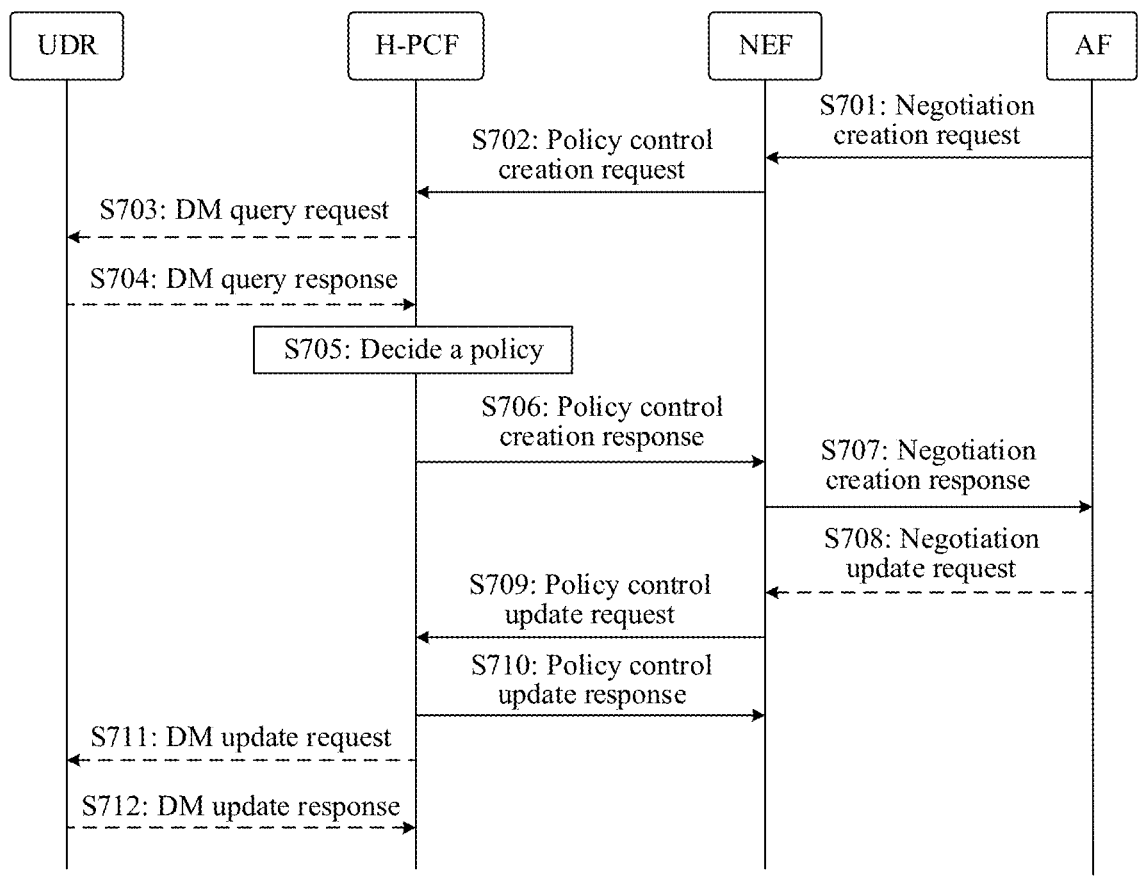
FIG. 7 is a schematic diagram of a negotiation procedure related to future background data transfer.

In addition, the standard provides a negotiation procedure related to future background data transfer (BDT), as shown in FIG. 7, including the following steps:

S701: An AF sends a negotiation creation request, that is, Nnef_BDTPNegotiation_Create request, to a NEF.

S702: The NEF sends a policy control creation request, that is, Npcf_BDTPolicyControl_Create request, to a Home-PCF (H-PCF).

S703: The H-PCF sends a DM query request, that is, Nudr_DM_Query request, to a UDR.

S704: The UDR sends a DM query response, that is, Nudr_DM_Query response, to the H-PCF.

S705: The H-PCF decides a policy.

S706: The H-PCF sends a policy control creation response, that is, Npcf_BDTPolicyControl_Create response, to the NEF.

S707: The NEF sends a negotiation creation response, that is, Nnef_BDTPNegotiation_Create response, to the AF.

S708: The AF sends a negotiation update request, that is, Nnef_BDTPNegotiation_Update request, to the NEF.

S709: The NEF sends a policy control update request, that is, Npcf_BDTPolicyControl_Update request, to the H-PCF.

S710: The H-PCF sends a policy control update response, that is, Npcf_BDTPolicyControl_Update response, to the NEF.

S711: The H-PCF sends a DM update request, that is, Nudr_DM_Update request, to the UDR.

S712: The UDR feeds back a DM update response, that is, Nudr_DM_Update response, to the H-PCF.

For other details of the steps in FIG. 7, reference may be made to the negotiation procedure part related to future background data transfer in the standard.

Related technologies of the embodiments of this application are described above. The technical solutions of the embodiments of this application are mainly using the UE policy mechanism newly introduced in 5G to transmit service information of the 5G MBS to the UE through the UE policy mechanism, thereby implementing standardized discovery and notification of a 5G MBS service. Since the existing UE policy and its transmission mechanism only support transmission of three types of UE policies, one UE policy is added to this application. In addition, the existing UE policy only defines signaling interaction between the PCF and the UE, and it is also necessary to define how the AF transmits the service information of the 5G MBS to the PCF. Therefore, the corresponding enhancement is also performed in the embodiments of this application. Implementation details of the technical solutions of the embodiments of this application are specifically described below.

Figure 8:
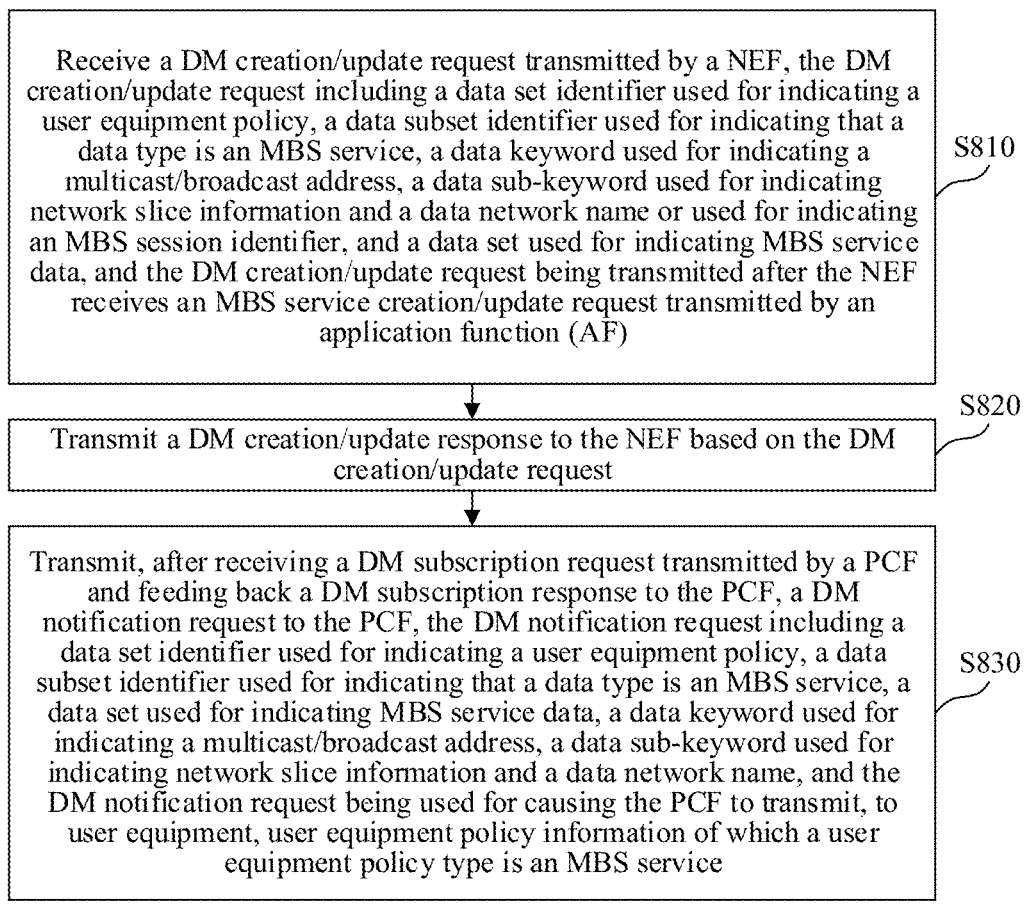
FIG. 8 is a flowchart 1 of a communication method for an MBS according to an embodiment of this application.

FIG. 8 is a flowchart of a communication method for an MBS according to an embodiment of this application. The communication method for an MBS may be performed by a UDR for an MBS (referred to as an MBS UDR). Referring to FIG. 8, the communication method for an MBS includes at least S810 to S830, which are described below in detail:

S810: Receive a DM creation/update request transmitted by a NEF, the DM creation/update request including a data set identifier used for indicating a UE policy, a data subset identifier used for indicating that a data type is an MBS service, a data keyword used for indicating a multicast/broadcast address, a data sub-keyword used for indicating network slice information and a data network name or used for indicating an MBS session identifier, and a data set used for indicating MBS service data, and the DM creation/update request being transmitted by the NEF receives an MBS service creation/update request transmitted by an AF is received.

In an embodiment of this application, in response to receiving an MBS service creation request transmitted by the AF, the NEF transmits a DM creation request to the MBS UDR, and in response to receiving an MBS service update request transmitted by the AF, the NEF transmits a DM update request to the MBS UDR.

In a possible implementation, the DM creation/update request further includes a set of subscription permanent identifiers participating in MBS communication. In an embodiment of this application, the MBS service creation/update request transmitted by the AF may be directed to a plurality of MBS services. Specifically, the MBS service creation/update request includes a fourth parameter list. The fourth parameter list includes a plurality of groups of parameters. Each group of parameters corresponds to one MBS service and includes a multicast/broadcast address, network slice information, a data network name, and MBS service data. In this case, the DM creation/update request transmitted by the NEF may also be directed to a plurality of MBS services. Specifically, The DM creation/update request may include a first parameter list. The first parameter list includes a plurality of groups of parameters. Each group of parameters correspond to one MBS service and includes a data set identifier used for indicating a UE policy, a data subset identifier used for indicating that a data type is an MBS service, a data keyword used for indicating a multicast/broadcast address, a data sub-keyword used for indicating network slice information and a data network name or used for indicating an MBS session identifier, a data set used for indicating MBS service data, and a set of subscription permanent identifiers participating in MBS communication.

In an embodiment of this application, the network slice information may be single network slice selection assistance information (S-NSSAI), the data network name is a data network name (DNN), and the subscription permanent identifier is a subscription permanent identifier (SUPI for short).

In an embodiment of this application, the data set identifier used for indicating a UE policy is Data Set ID:=UE Policy, the data subset identifier used for indicating that a data type is an MBS service is Data Subset ID:=MBS Service data, the data keyword used for indicating a multicast/broadcast address is Data Key:=Broadcast/Multicast IP/MAC address, the data sub-keyword used for indicating network slice information and a data network name or used for indicating an MBS session identifier is Data Subkey:=

(S-NSSAI and DNN) or MBS Session ID, and the data set used for indicating MBS service data is data set:=MBS Service data.

S820: Transmit a DM creation/update response to the NEF based on the DM creation/update request.

S830: Transmit, after receiving a DM subscription request transmitted by a PCF and returning a DM subscription response to the PCF, a DM notification request to the PCF, the DM notification request including a data set identifier used for indicating a UE policy, a data subset identifier used for indicating that a data type is an MBS service, a data set used for indicating MBS service data, a data keyword used for indicating a multicast/broadcast address, a data sub-keyword used for indicating network slice information and a data network name, and the DM notification request being used for causing the PCF to transmit, to UE, UE policy information of which a UE policy type is an MBS service.

In an embodiment of this application, similar to the foregoing descriptions, the DM notification request may also be directed to a plurality of MBS services. Specifically, the DM notification request includes a second parameter list. The second parameter list includes a plurality of groups of parameters. Each group of parameters includes a data set identifier used for indicating a UE policy, a data subset identifier used for indicating that a data type is an MBS service, a data set used for indicating MBS service data, a data keyword used for indicating a multicast/broadcast address, and a data sub-keyword used for indicating network slice information and a data network name.

In an embodiment of this application, after sending the DM creation/update response to the NEF, the MBS UDR may receive the DM subscription request transmitted by the PCF. The DM subscription request includes a subscription permanent identifier, a data set identifier used for indicating a UE policy, a data subset identifier used for indicating that a data type is an MBS service, a notification target address (that is, a notification target address), and a notification correlation identifier (that is, a notification correlation ID). The DM subscription request is transmitted by the PCF after it is detected that the UE registers with a network. After receiving the DM subscription request transmitted by the PCF, the MBS UDR may return the DM subscription response to the PCF based on the DM subscription request.

In some embodiments, the MBS UDR may return, when the subscription permanent identifier included in the DM subscription request belongs to the set of subscription permanent identifiers in the DM creation/update request transmitted by the NEF, the DM subscription response including a subscription success message to the PCF.

In an embodiment of this application, the MBS UDR may also receive, before receiving the DM creation/update request transmitted by the NEF, the DM subscription request transmitted by the PCF. The DM subscription request includes a subscription permanent identifier, a data set identifier used for indicating a UE policy, a data subset identifier used for indicating that a data type is an MBS service, a notification target address, and a notification correlation identifier, and the DM subscription request being transmitted by the PCF after it is detected that the UE registers with a network. After receiving the DM subscription request transmitted by the PCF, the MBS UDR may return the DM subscription response to the PCF based on the DM subscription request.

In an embodiment of this application, the MBS UDR may also receive a DM deletion request transmitted by the NEF. The DM deletion request includes a data set identifier used for indicating a UE policy, a data subset identifier used for indicating that a data type is an MBS service, a data keyword used for indicating a multicast/broadcast address, and a data sub-keyword used for indicating network slice information and a data network name or used for indicating a MBS session identifier. Then, the MBS UDR may delete, based on the DM deletion request, the UE policy indicated by the data set identifier, and return a DM deletion response to the NEF.

In an embodiment of this application, the MBS UDR may also receive a DM obtaining request transmitted by the NEF. The DM obtaining request includes a data set identifier used for indicating a UE policy, a data subset identifier used for indicating that a data type is an MBS service, a data keyword used for indicating a multicast/broadcast address, and a data sub-keyword used for indicating network slice information and a data network name or used for indicating a MBS session identifier. Then, the MBS UDR obtains the MBS service data based on the DM obtaining request, and feeds back a DM obtaining response to the NEF. The DM obtaining response includes the MBS service data.

Figure 9:
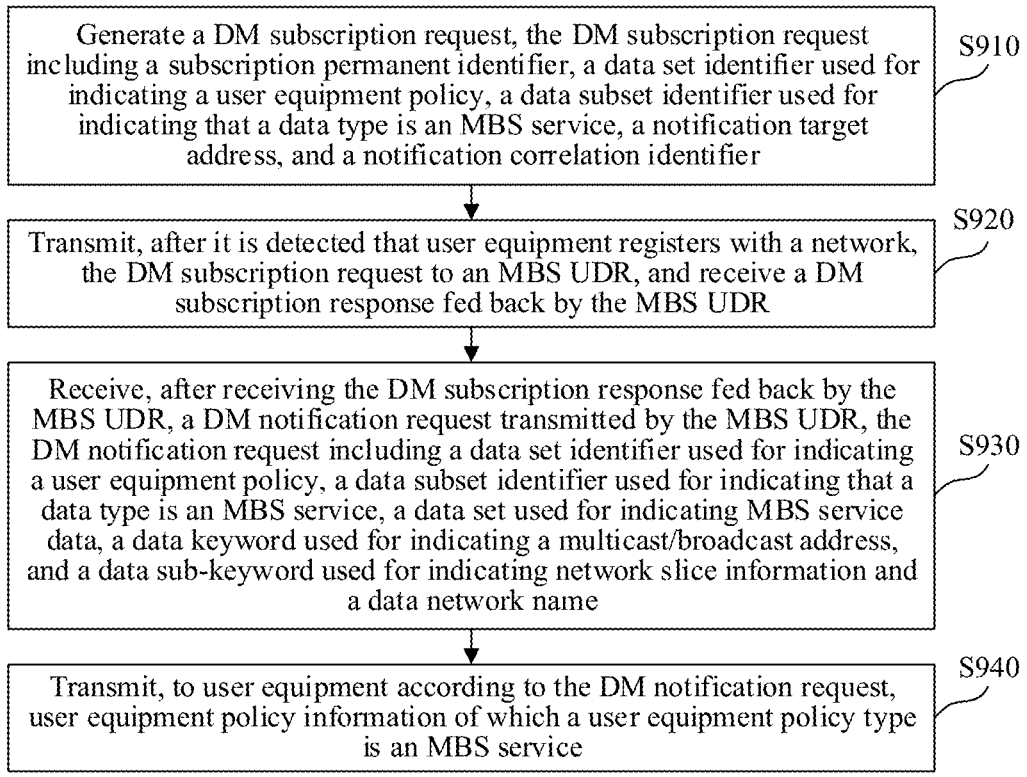
FIG. 9 is a flowchart 2 of a communication method for an MBS according to an embodiment of this application.

FIG. 9 is a flowchart of a communication method for an MBS according to an embodiment of this application. The communication method for an MBS may be performed by a PCF. Referring to FIG. 9, the communication method for an MBS includes at least S910 to S940, which are described below in detail:

S910: Generate a DM subscription request, the DM subscription request including a subscription permanent identifier, a data set identifier used for indicating a UE policy, a data subset identifier used for indicating that a data type is an MBS service, a notification target address, and a notification correlation identifier.

In an embodiment of this application, the DM subscription request may be directed to a plurality of UEs. Specifically, the DM subscription request includes a third parameter list. The third parameter list includes a plurality of groups of parameters. Each group of parameters includes a subscription permanent identifier, a data set identifier used for indicating a UE policy, a data subset identifier used for indicating that a data type is an MBS service, a notification target address, and a notification correlation identifier.

S920: Transmit, after it is detected that UE registers with a network, the DM subscription request to an MBS UDR, and receive a DM subscription response fed back by the MBS UDR.

In an embodiment of this application, when the UE registers with the network, an AMF selects one PCF, and further, the PCF registers with the MBS UDR, that is, transmits a generated DM subscription request to the MBS UDR.

In an embodiment of this application, before transmitting the DM subscription request to the MBS UDR, the PCF may also query an NRF for identifier information of the MBS UDR according to a multicast/broadcast address and an MBS session identifier included in subscription data of the UE or according to a multicast/broadcast address, network slice information, and a data network name included in the subscription data, to transmit the DM subscription request to the MBS UDR according to the identifier information.

In an embodiment of this application, the MBS UDR feeds back, when the subscription permanent identifier included in the DM subscription request belongs to the set of subscription permanent identifiers included in the DM creation/update request transmitted by the NEF to the MBS UDR, the DM subscription response including a subscription success message to the PCF.

S930: Receive, after receiving the DM subscription response fed back by the MBS UDR, a DM notification request transmitted by the MBS UDR, the DM notification request including a data set identifier used for indicating a UE policy, a data subset identifier used for indicating that a data type is an MBS service, a data set used for indicating MBS service data, a data keyword used for indicating a multicast/broadcast address, and a data sub-keyword used for indicating network slice information and a data network name or used for indicating an MBS session identifier.

S940: Transmit, to UE according to the DM notification request, UE policy information of which a UE policy type is an MBS service.

In an embodiment of this application, the procedure of transmitting, to UE, UE policy information of which a UE policy type is an MBS service may be specifically: generating an information transfer request, the information transfer request including a PCF identifier and a UE policy management instruction, a UE policy type included in the UE policy management instruction being an MBS service, and a UE policy included in the UE policy management instruction including MBS service data, a multicast/broadcast address, network slice information, and a data network name; and then transmitting the information transfer request to AMF, to cause the AMF to transmit the UE policy management instruction to the UE through a non-access stratum.

In an embodiment of this application, after transmitting the information transfer request to the AMF, the PCF may receive an information transfer response transmitted by the AMF, the information transfer response including a UE management completion message.

In an embodiment of this application, the UE policy management instruction may also be directed to a plurality of MBS services. Specifically, the UE policy included in the UE policy management instruction includes a plurality of groups of parameters. Each group of parameters corresponds to one MBS service and includes MBS service data, a multicast/broadcast address, network slice information, and a data network name.

Figure 10:
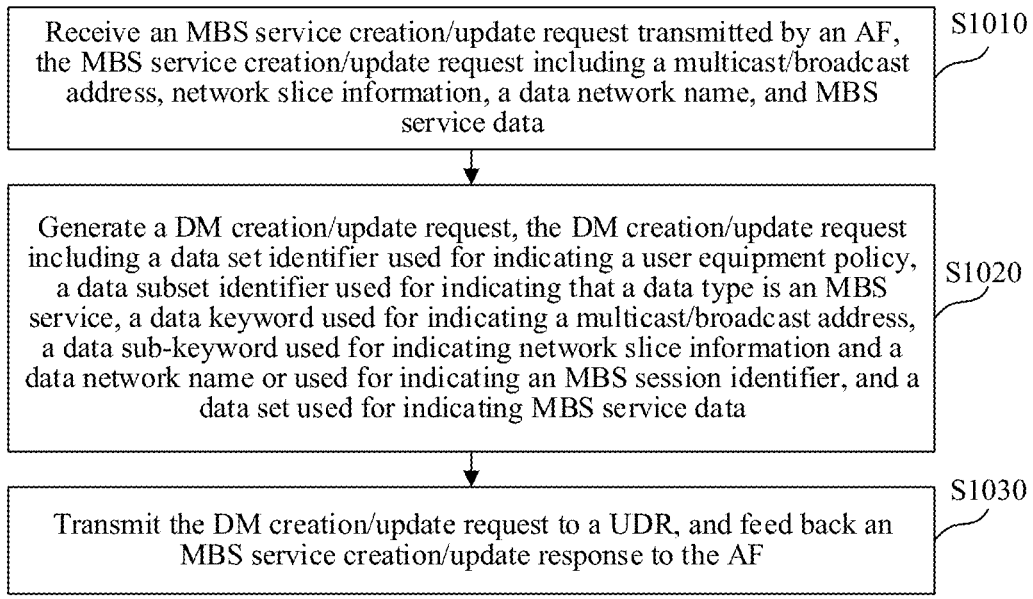
FIG. 10 is a flowchart 3 of a communication method for an MBS according to an embodiment of this application.

FIG. 10 is a flowchart of a communication method for an MBS according to an embodiment of this application. The communication method for an MBS may be performed by a NEF. Referring to FIG. 10, the communication method for an MBS includes at least S1010 to S1030, which are described below in detail:

S1010: Receive an MBS service creation/update request transmitted by an AF, the MBS service creation/update request including a multicast/broadcast address, network slice information, a data network name, and MBS service data.

In an embodiment of this application, as stated above, the MBS service creation/update request may be directed to a plurality of MBS services. Specifically, the MBS service creation/update request includes a fourth parameter list. The fourth parameter list includes a plurality of groups of parameters. Each group of parameters corresponds to one MBS service and includes a multicast/broadcast address, network slice information, a data network name, and MBS service data.

S1020: Generate a DM creation/update request, the DM creation/update request including a data set identifier used for indicating a UE policy, a data subset identifier used for indicating that a data type is an MBS service, a data keyword used for indicating a multicast/broadcast address, a data sub-keyword used for indicating network slice information and a data network name or used for indicating an MBS session identifier, and a data set used for indicating MBS service data.

In a possible implementation, the DM creation/update request further includes a set of subscription permanent identifiers participating in MBS communication.

In an embodiment of this application, the DM creation/update request may also be directed to a plurality of MBS services. The DM creation/update request includes a first parameter list. The first parameter list includes a plurality of groups of parameters. Each group of parameters corresponds to one MBS service and includes a data set identifier used for indicating a UE policy, a data subset identifier used for indicating that a data type is an MBS service, a data keyword used for indicating a multicast/broadcast address, a data sub-keyword used for indicating network slice information and a data network name or used for indicating an MBS session identifier, a data set used for indicating MBS service data, and a set of subscription permanent identifiers participating in MBS communication.

In an embodiment of this application, before generating a DM creation/update request, the NEF may query, according to the multicast/broadcast address, identifier information of a network slice, and the data network name included in the MBS service creation/update request, the MBS UDR for a subscription permanent identifier subscribed to a relevant MBS service, to obtain the set of subscription permanent identifiers described in the foregoing embodiments.

S1030: Transmit the DM creation/update request to an MBS UDR, and return an MBS service creation/update response to the AF.

In an embodiment of this application, before transmitting the DM creation/update request to the MBS UDR, the NEF may also query an NRF for identifier information of the MBS UDR according to a multicast/broadcast address and an MBS session identifier or according to a multicast/broadcast address, network slice information, and a data network name, to transmit the DM creation/update request to the MBS UDR according to the identifier information.

In an embodiment of this application, after the NEF transmits the DM creation/update request to the MBS UDR, the MBS UDR may store or update a corresponding UE policy (that is, a UE policy included in the DM creation/update request) based on the DM creation/update request.

In an embodiment of this application, the NEF may also receive an MBS service deletion request transmitted by the AF, the MBS service deletion request including a multicast/broadcast address, network slice information, and a data network name. Then, the NEF generates a DM deletion request based on the MBS service deletion request, the DM deletion request including a data set identifier used for indicating a UE policy, a data subset identifier used for indicating that a data type is an MBS service, a data keyword used for indicating a multicast/broadcast address, and a data sub-keyword used for indicating network slice information and a data network name or used for indicating a MBS session identifier. After generating the DM deletion request, the NEF may transmit the DM deletion request to the MBS UDR. Further, the MBS UDR may delete, based on the DM deletion request, the UE policy indicated by the data set identifier.

In an embodiment of this application, the NEF may also receive an MBS service obtaining request transmitted by the AF, the MBS service obtaining request including a multicast/broadcast address, network slice information, and a data network name. Then, the NEF generates a DM obtaining request based on the MBS service obtaining request, the DM obtaining request including a data set identifier used for indicating a UE policy, a data subset identifier used for indicating that a data type is an MBS service, a data keyword used for indicating a multicast/broadcast address, and a data sub-keyword used for indicating network slice information and a data network name or used for indicating a MBS session identifier. After generating the DM obtaining request, the NEF may transmit the DM obtaining request to the MBS UDR. Further, the MBS UDR may obtain corresponding MBS service data based on the DM obtaining request, and return the MBS service data to the NEF. Then, the NEF may return an MBS service obtaining response to the AF, the MBS service obtaining response including the MBS service data.

Figure 11:
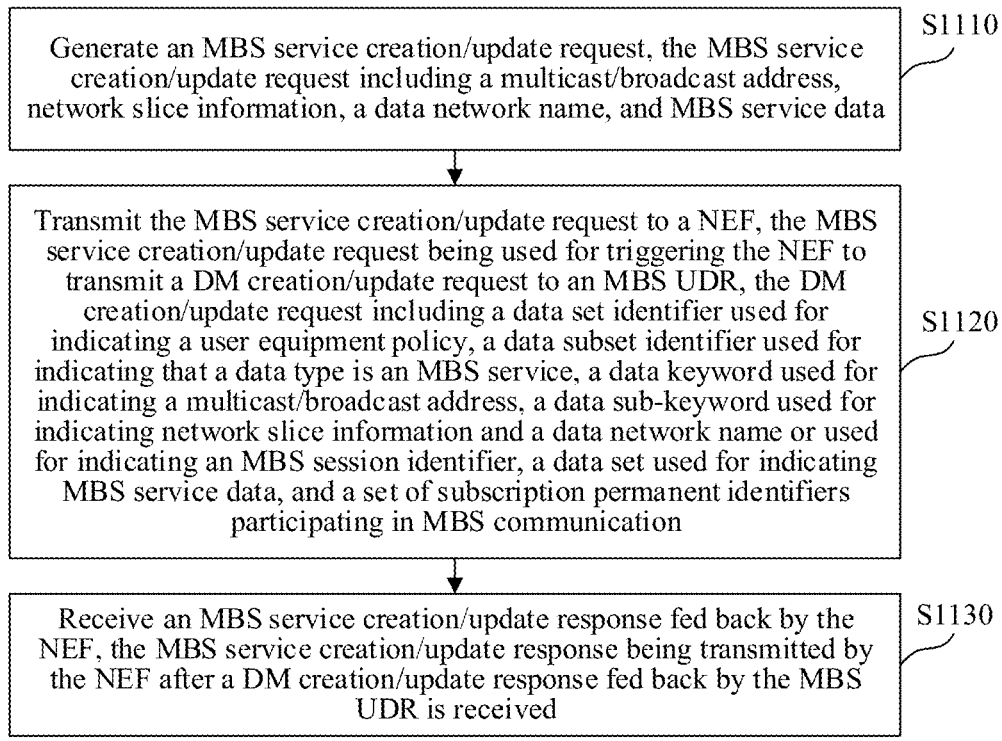
FIG. 11 is a flowchart 4 of a communication method for an MBS according to an embodiment of this application.

FIG. 11 is a flowchart of a communication method for an MBS according to an embodiment of this application. The communication method for an MBS may be performed by an AF. Referring to FIG. 11, the communication method for an MBS includes at least S1110 to S1130, which are described below in detail:

S1110: Generate an MBS service creation/update request, the MBS service creation/update request including a multicast/broadcast address, network slice information, a data network name, and MBS service data.

In an embodiment of this application, the MBS service creation/update request may be directed to a plurality of MBS services. In this case, the MBS service creation/update request includes a fourth parameter list. The fourth parameter list includes a plurality of groups of parameters. Each group of parameters corresponds to one MBS service and includes a multicast/broadcast address, network slice information, a data network name, and MBS service data.

S1120: Transmit the MBS service creation/update request to a NEF, the MBS service creation/update request being used for triggering the NEF to transmit a DM creation/update request to an MBS UDR, the DM creation/update request including a data set identifier used for indicating a UE policy, a data subset identifier used for indicating that a data type is an MBS service, a data keyword used for indicating a multicast/broadcast address, a data sub-keyword used for indicating network slice information and a data network name or used for indicating an MBS session identifier, a data set used for indicating MBS service data, and a set of subscription permanent identifiers participating in MBS communication.

In an embodiment of this application, regardless of whether the UE registers with a network, after generating an MBS service creation/update request, the AF can always transmit the MBS service creation/update request to the NEF. In some embodiments, the AF may the MBS service creation/update request to the NEF after detecting that the UE registers with the network.

S1130: Receive an MBS service creation/update response fed back by the NEF, the MBS service creation/update response being transmitted by the NEF after a DM creation/update response fed back by the MBS UDR is received.

In an embodiment of this application, the AF may also receive an MBS service deletion request generated according to service requirements, the MBS service deletion request including a multicast/broadcast address, network slice information, and a data network name. Then, the AF transmits the MBS service deletion request to the NEF, the MBS service deletion request being used for triggering the NEF to transmit a DM deletion request to the MBS UDR, the DM deletion request including a data set identifier used for indicating a UE policy, a data subset identifier used for indicating that a data type is an MBS service, a data keyword used for indicating a multicast/broadcast address, and a data sub-keyword used for indicating network slice information and a data network name or used for indicating a MBS session identifier. After the NEF transmits the DM deletion request to the MBS UDR, when a DM deletion response fed back by the MBS UDR is received, the NEF feeds back an MBS service deletion response to the AF.

In an embodiment of this application, the AF may also receive an MBS service obtaining request generated according to service requirements, the MBS service obtaining request including a multicast/broadcast address, network slice information, and a data network name. Then, the AF transmits the MBS service obtaining request to the NEF, the MBS service obtaining request being used for triggering the NEF to transmit a DM obtaining request to the MBS UDR, the DM obtaining request including a data set identifier used for indicating a UE policy, a data subset identifier used for indicating that a data type is an MBS service, a data keyword used for indicating a multicast/broadcast address, and a data sub-keyword used for indicating network slice information and a data network name or used for indicating a MBS session identifier. After the NEF transmits the DM obtaining request to the MBS UDR, when a DM obtaining response fed back by the MBS UDR is received, the NEF feeds back an MBS service obtaining response to the AF.

Figure 12:
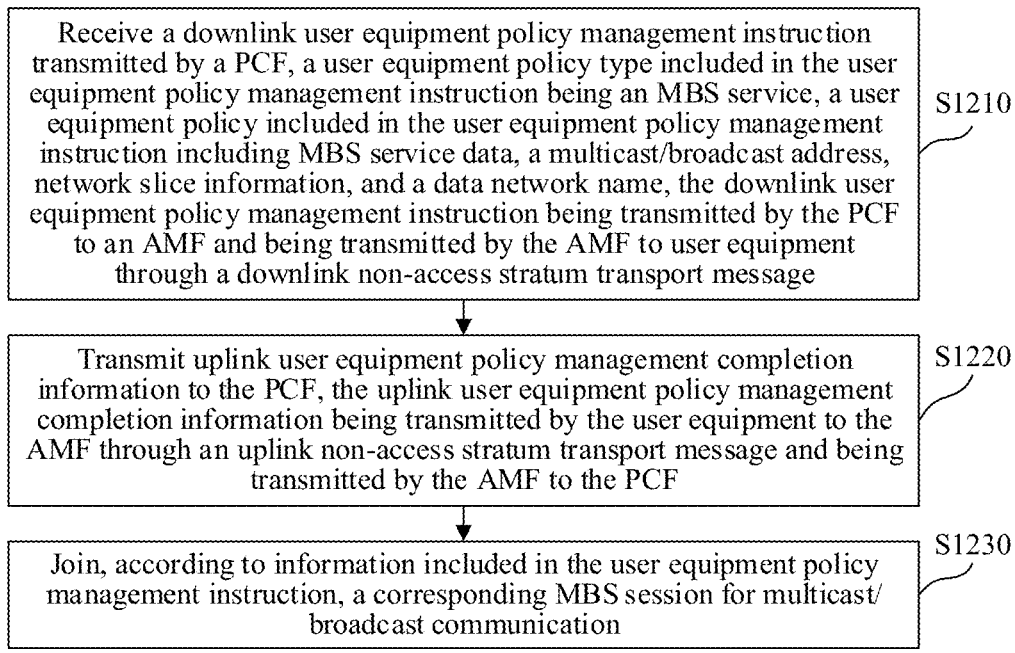
FIG. 12 is a flowchart 5 of a communication method for an MBS according to an embodiment of this application.

FIG. 12 is a flowchart of a communication method for an MBS according to an embodiment of this application. The communication method for an MBS may be performed by a UE. Referring to FIG. 12, the communication method for an MBS includes at least S1210 to S1230, which are described below in detail:

S1210: Receive a downlink UE policy management instruction transmitted by a PCF, a UE policy type included in the UE policy management instruction being an MBS service, a UE policy included in the UE policy management instruction including MBS service data, a multicast/broadcast address, network slice information, and a data network name, the downlink UE policy management instruction being transmitted by the PCF to an AMF and being transmitted by the AMF to UE through a downlink non-access stratum transport message. That is, in this embodiment, the AMF performs message transfer between the UE and the PCF.

S1220: Transmit uplink UE policy management completion information to the PCF, the uplink UE policy management completion information being transmitted by the UE to the AMF through an uplink non-access stratum transport message and being transmitted by the AMF to the PCF.

S1230: Join, according to information included in the UE policy management instruction, a corresponding MBS session for multicast/broadcast communication.

In an embodiment of this application, the UE policy management instruction may be directed to a plurality of MBS services. Specifically, the UE policy in the UE policy management instruction includes a plurality of groups of parameters. Each group of parameters corresponds to one MBS service and includes MBS service data, a multicast/broadcast address, network slice information, and a data network name. In this case, the process of joining, according to information included in the UE policy management instruction, a corresponding MBS session for multicast/broadcast communication may be specifically: selecting at least one group of parameters from the plurality of groups of parameters, and joining, according to a start time of an MBS service included in the selected parameters, an MBS session corresponding to the selected parameters for multicast/broadcast communication before the start time of the MBS service.

In an embodiment of this application, when a current time has exceeded the start time of the MBS service, the UE can join the MBS session corresponding to the selected parameters immediately for multicast/broadcast communication.

Figure 13:
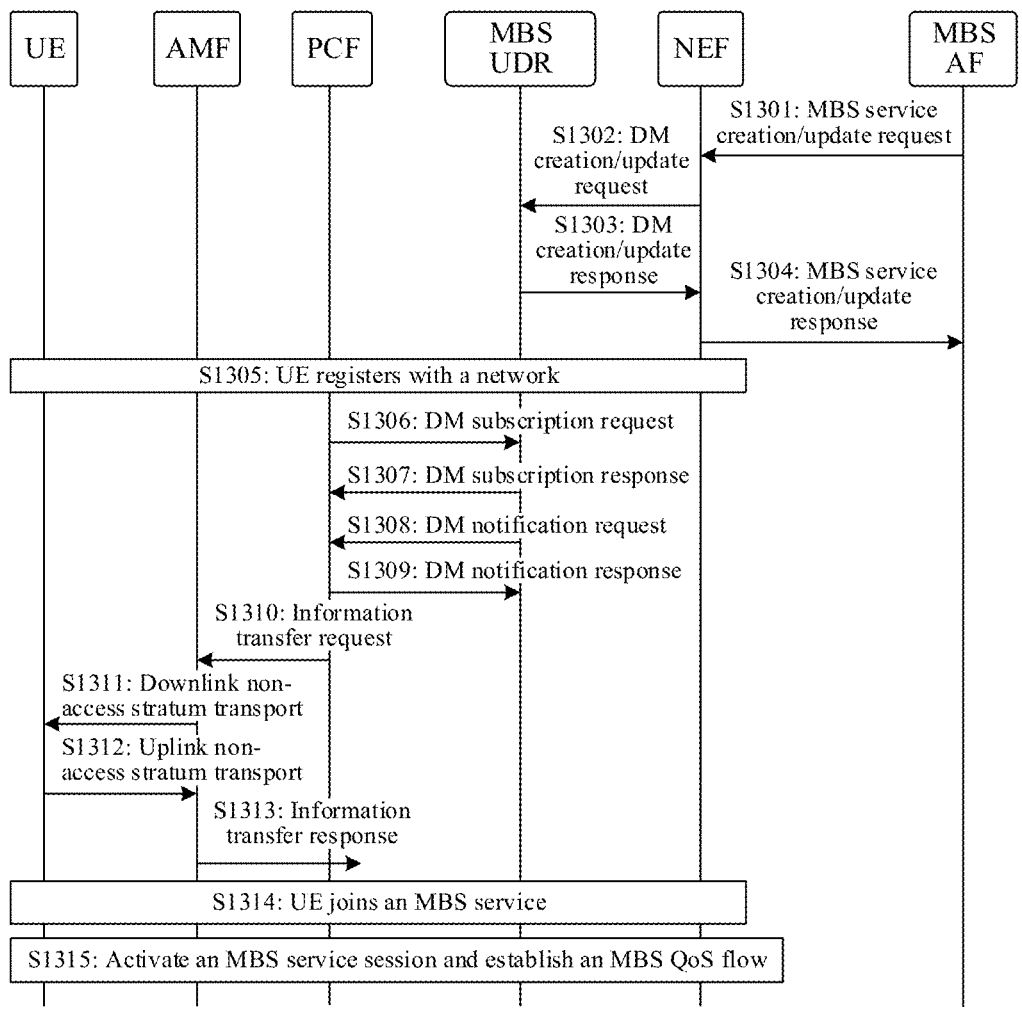
FIG. 13 is a flowchart 6 of a communication method for an MBS according to an embodiment of this application.
Figure 14:
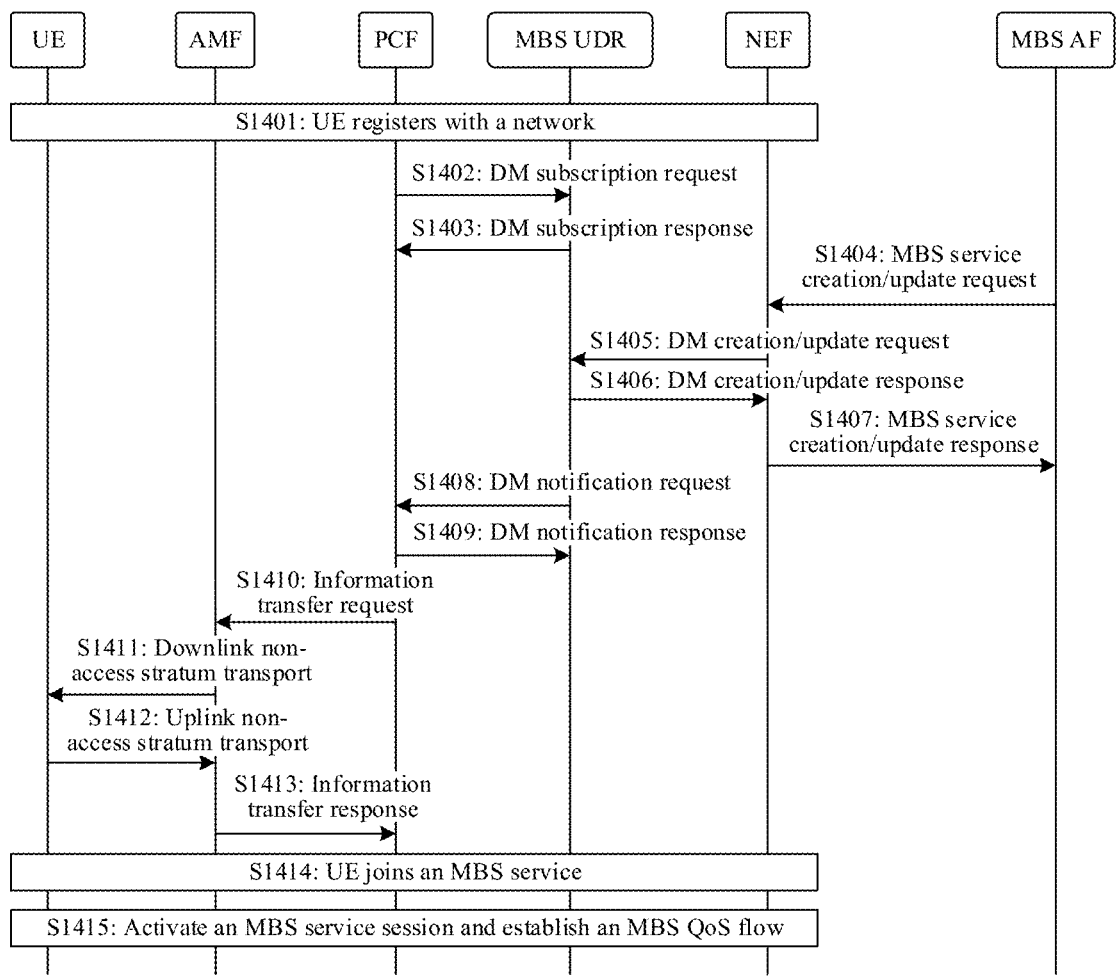
FIG. 14 is a flowchart 7 of a communication method for an MBS according to an embodiment of this application.

The communication method for an MBS according to the embodiments of this application is described above respectively from the perspectives of the MBS UDR, PCF, NEF, AF, and UE. With reference to FIG. 13 and FIG. 14, implementation details of the technical solutions of the embodiments of this application are described below from the perspective of interaction between entities.

As shown in FIG. 13, a communication method for an MBS according to an embodiment of this application includes the following steps:

S1301: An MBS AF transmits an MBS service creation/update request to a NEF.

In an embodiment of this application, the MBS service creation/update request transmitted by the MBS AF to the NEF may be Nnef_MBSServiceCreate/Update Request (Broadcast/Multicast IP/MAC address, S-NSSAI, DNN, MBS Service data). The broadcast/multicast IP/MAC address refers to an IP address or a Media Access Control (MAC) address of a multicast/broadcast service.

In an embodiment of this application, the MBS service creation/update request transmitted by the MBS AF to the NEF may be directed to a plurality of MBS services. In this case, the MBS service creation/update request includes a parameter list. Each group of parameters in the parameter list corresponds to one MBS service, and includes, as stated above: Broadcast/Multicast IP/MAC address, S-NSSAI, DNN, MBS Service data.

S1302: The NEF transmits a DM creation/update request to an MBS UDR.

In an embodiment of this application, the DM creation/update request transmitted by the NEF to the MBS UDR may be Nudr_DMCreate/Update Request (Data Set ID:=UE Policy, Data Subset ID:=MBS Service data, Data Key:=Broadcast/Multicast IP/MAC address, Data Subkey:=(S-NSSAI and DNN) or MBS Session ID, data set:=MBS Service data, SUPI's). Data Subset ID is used to indicate that a data type is an MBS service, data set is used to indicate MBS service data, and SUPI's are used to indicate a set of subscription permanent identifiers.

In an embodiment of this application, the DM service creation/update request transmitted by the NEF to the MBS UDR may be directed to a plurality of MBS services. In this case, the DM service creation/update request includes a parameter list. Each group of parameters in the parameter list corresponds to one MBS service, and includes, as stated above: Data Set ID:=UE Policy, Data Subset ID:=MBS Service data, Data Key:=Broadcast/Multicast IP/MAC address, Data Subkey:=(S-NSSAI and DNN) or MBS Session ID, data set:=MBS Service data, SUPI's.

In the foregoing embodiments, when Data Key:=Broadcast/Multicast IP/MAC address, Data Subkey:=(S-NSSAI and DNN), or Data Subkey:=MBS session ID. In other embodiments of this application, Data Key may also be set to MBS session ID, and in this case, Data Subkey:=(S-NSSAI and DNN).

In an embodiment of this application, before transmitting a DM creation/update request to the MBS UDR, the NEF needs to query, according to the multicast/broadcast address, identifier information of a network slice, and the data network name included in the MBS service creation/update request, the MBS UDR for a subscription permanent identifier subscribed to a relevant MBS service, to obtain SUPI's.

SUPI's included in the DM creation/update request are an optional parameter. Specifically, when before transmitting the DM creation/update request to the MBS UDR, the NEF has found SUPI's subscribed to the relevant MBS service by querying the MBS UDR and has also notified the MBS UDR of the SUPI's through signaling, then the DM creation/update request transmitted by the NEF to the MBS UDR may also not include the SUPI's.

In an embodiment of this application, before transmitting a DM creation/update request to the MBS UDR, the NEF needs to query the NRF according to the multicast/broadcast address, identifier information of a network slice, and the data network name included in the MBS service creation/update request, to obtain a corresponding MBS UDR identifier, and then, transmit the DM creation/update request to the MBS UDR based on the MBS UDR identifier.

S1303: The MBS UDR feeds back a DM creation/update response to the NEF.

In an embodiment of this application, the DM creation/update response fed back by the MBS UDR to the NEF may be Nudr_DMCreate/Update Response( ).

S1304: The NEF transmits an MBS service creation/update response to the MBS AF.

In an embodiment of this application, the MBS service creation/update response transmitted by the NEF to the MBS AF may be Nnef_MBSServiceCreate/Update Response( ).

S1305: UE registers with a network.

In an embodiment of this application, after the UE registers with the network, an AMF accessed by the UE selects a PCF, and the PCF provides access and mobility policy control of the UE for the AMF accessed by the UE, and provides a UE policy to the UE.

S1306: After determining, according to subscription data of the UE, that the UE has subscribed to the MBS service, the PCF determines a corresponding MBS UDR according to an MBS multicast/broadcast address and an MBS session ID in the subscription data or determines the corresponding MBS UDR according to S-NSSAI, a DNN, and the MBS multicast/broadcast address, and transmit a DM subscription request to the MBS UDR.

The subscription data UDR of the UE and the MBS UDR for the MBS service are logically different UDRs. The subscription data UDR of the UE is obtained by the PCF after querying the NRF according to a SUPI of the UE. The MBS UDR is obtained by the PCF by querying the NRF according to the broadcast/multicast IP/MAC address and the MBS session ID in the subscription data of the UE or according to the broadcast/multicast IP/MAC address, the S-NSSAI, and the DNN. Obviously, the identifier of the UE is not used when the MBS UDR is queried, indicating that the MBS UDR is an MBS UDR independent of the UE.

In an embodiment of this application, the DM subscription request transmitted by the PCF to the MBS UDR may be Nudr_DMSubscribe Request (SUPI, Data Set ID:=UE Policy; Data Subset ID:=MBS Service data, Data Key:=*, Notification Target Address+Notification Correlation ID). Data Key:=* indicates that the network address of the multicast/broadcast service is not specified and is optional.

In an embodiment of this application, the DM subscription request transmitted by the PCF to the MBS UDR may also be directed to a plurality of users. In this case, the DM subscription request includes a parameter list. Each group of parameters in the parameter list includes, as stated above: SUPI, Data Set ID:=UE Policy; Data Subset ID:=MBS Service data, Data Key:=*, Notification Target Address+Notification Correlation ID.

SUPI included in the DM subscription request is an optional parameter. Specifically, when the PCF has notified the MBS UDR of the SUPI/SUPI's through signaling before transmitting the DM subscription request to the MBS UDR, the DM subscription request transmitted by the PCF to the MBS UDR may not include the SUPI/SUPI's.

In an embodiment of this application, before transmitting the DM subscription request to the MBS UDR, the PCF needs to query the NRF based on the solution in the foregoing embodiment to obtain a corresponding MBS UDR identifier, and then transmit the DM subscription request to the MBS UDR based on the MBS UDR identifier.

S1307: The MBS UDR feeds back a DM subscription response to the PCF.

In an embodiment of this application, the DM subscription response fed back by the MBS UDR to the PCF may be Nudr_DMSubscribe Response( ).

S1308: The MBS UDR transmits a DM notification request to the PCF.

In an embodiment of this application, the DM notification request transmitted by the MBS UDR to the PCF may be Nudr_DMNotify Request (Data Set ID:=UE Policy; Data Subset ID:=MBS Service data; data set:=MBS Service data, Data Key:=*).

In an embodiment of this application, the DM notification request transmitted by the MBS UDR to the PCF may include a parameter list. Each group of parameters in the parameter list includes, as stated above: Data Set ID:=UE Policy; Data Subset ID:=MBS Service data; data set:=MBS Service data, Data Key:=*.

Only when determining that the SUPI (or the SUPI notified in advance) included in the DM subscription request belongs to the SUPI's (or the SUPI's notified in advance) included in the DM creation/update request, the MBS UDR transmits a DM notification request to the PCF. In addition, Data Key:=* indicates that the network address of the multicast/broadcast service is not specified and is optional.

S1309: The PCF transmits a DM notification response to the MBS UDR.

In an embodiment of this application, the DM notification response transmitted by the PCF to the MBS UDR may be Nudr_DMNotify Response( ).

S1310: The PCF transmits an information transfer request to the AMF.

In an embodiment of this application, the information transfer request sent by the PCF to the AMF may be Namf_Communication_N1N2MessageTransfer Request (PCF ID, N1Message (Manage UE Policy Command (MBS Service Data, Multicast/Broadcast IP/MAC Address, S-NSSAI+DNN))).

When MBS Session ID can represent a multicast/broadcast address, Broadcast/Multicast IP/MAC address in the information transfer request transmitted by the PCF to the AMF may also be replaced with MBS Session ID.

S1311: The AMF transmits a downlink non-access stratum transport message to the UE.

In an embodiment of this application, the downlink non-access stratum transport message transmitted by the AMF to the UE may be a DL NAS Transport (N1 Message (Manage UE Policy Command (MBS Service Data, Multicast/Broadcast IP/MAC address, S-NSSAI+DNN)).

Similarly, when MBS Session ID can represent a multicast/broadcast address, Broadcast/Multicast IP/MAC address in DL NAS Transport transmitted by the AMF to the UE may also be replaced with MBS Session ID.

S1312: The UE transmits an uplink non-access stratum transport message to the AMF.

In an embodiment of this application, the uplink non-access stratum transport message transmitted by the UE to the AMF may be UL NAS Transport (N1 Message (Manage UE Policy Complete( ).

S1313: The AMF transmits an information transfer response to the PCF.

In an embodiment of this application, the information transfer response transmitted by the AMF to the PCF may be Namf_Communication_N1N2MessageTransfer Response (N1Message(Manage UE Policy Complete( ))).

S1314: The UE joins an MBS service according to a received UE policy of the MBS service.

Specifically, the UE may select a group of parameters from a plurality of groups of parameters in the received UE Policy of the MBS service, and join, according to a start time of the MBS service included in the selected parameters, the MBS session for multicast or broadcast communication before the start time of the MBS service. When a current time has exceeded the start time of the MBS service, the UE joins the MBS session corresponding to the selected parameters immediately for multicast or broadcast communication.

S1315: Activate an MBS service session, and establish an MBS Quality of Service (QoS) flow.

As shown in FIG. 14, a communication method for an MBS according to an embodiment of this application includes the following steps:

S1401: UE registers with a network.

In an embodiment of this application, after the UE registers with the network, an AMF accessed by the UE selects a PCF, and the PCF provides access and mobility policy control of the UE for the AMF accessed by the UE, and provides a UE policy to the UE.

S1402: After determining, according to subscription data of the UE, that the UE has subscribed to the MBS service, the PCF determines a corresponding MBS UDR according to an MBS multicast/broadcast address and an MBS session ID in the subscription data or determines the corresponding MBS UDR according to S-NSSAI, a DNN, and the MBS multicast/broadcast address, and transmit a DM subscription request to the MBS UDR.

Similar to the descriptions in the foregoing embodiments, the subscription data UDR of the UE and the MBS UDR for the MBS service are logically different UDRs. The subscription data UDR of the UE is obtained by the PCF after querying the NRF according to a SUPI of the UE. The MBS UDR is obtained by the PCF by querying the NRF according to Broadcast/Multicast IP/MAC address and MBS Session ID or according to Broadcast/Multicast IP/MAC address, S-NSSAI, and DNN.

In an embodiment of this application, the DM subscription request transmitted by the PCF to the MBS UDR may be Nudr_DMSubscribe Request (SUPI, Data Set ID:=UE Policy; Data Subset ID:=MBS Service data, Data Key:=*, Notification Target Address+Notification Correlation ID). Data Key:=* indicates that the network address of the multicast/broadcast service is not specified and is optional.

In an embodiment of this application, the DM subscription request transmitted by the PCF to the MBS UDR may also be directed to a plurality of users. In this case, the DM subscription request includes a parameter list. Each group of parameters in the parameter list includes, as stated above: SUPI, Data Set ID:=UE Policy; Data Subset ID:=MBS Service data, Data Key:=*, Notification Target Address+Notification Correlation ID.

SUPI included in the DM subscription request is an optional parameter. Specifically, when the PCF has notified the MBS UDR of the SUPI/SUPI's through signaling before transmitting the DM subscription request to the MBS UDR, the DM subscription request transmitted by the PCF to the MBS UDR may not include the SUPI/SUPI's.

In an embodiment of this application, before transmitting the DM subscription request to the MBS UDR, the PCF needs to query the NRF according to Data Key and Data SubKey to obtain a corresponding MBS UDR identifier, and then transmit the DM subscription request to the MBS UDR based on the MBS UDR identifier.

S1403: The MBS UDR feeds back a DM subscription response to the PCF.

In an embodiment of this application, the DM subscription response fed back by the MBS UDR to the PCF may be Nudr_DMSubscribe Response( ).

S1404: An MBS AF transmits an MBS service creation/update request to a NEF.

In an embodiment of this application, the MBS service creation/update request transmitted by the MBS AF to the NEF may be Nnef_MBSServiceCreate/Update Request (Broadcast/Multicast IP/MAC address, S-NSSAI, DNN, MBS Service data). The broadcast/multicast IP/MAC address refers to an IP address or a Media Access Control (MAC) address of a multicast/broadcast service.

In an embodiment of this application, the MBS service creation/update request transmitted by the MBS AF to the NEF may be directed to a plurality of MBS services. In this case, the MBS service creation/update request includes a parameter list. Each group of parameters in the parameter list corresponds to one MBS service, and includes, as stated above: Broadcast/Multicast IP/MAC address, S-NSSAI, DNN, MBS Service data.

S1405: The NEF transmits a DM creation/update request to an MBS UDR.

In an embodiment of this application, the DM creation/update request transmitted by the NEF to the MBS UDR may be Nudr_DMCreate/Update Request (Data Set ID:=UE Policy, Data Subset ID:=MBS Service data, Data Key:=Broadcast/Multicast IP/MAC address, Data Subkey:=(S-NSSAI and DNN) or MBS Session ID, data set:=MBS Service data, SUPI's). Data Subset ID is used to indicate that a data type is an MBS service, data set is used to indicate MBS service data, and SUPI's are used to indicate a set of subscription permanent identifiers.

In an embodiment of this application, the DM service creation/update request transmitted by the NEF to the MBS UDR may be directed to a plurality of MBS services. In this case, the DM service creation/update request includes a parameter list. Each group of parameters in the parameter list corresponds to one MBS service, and includes, as stated above: Data Set ID:=UE Policy, Data Subset ID:=MBS Service data, Data Key:=Broadcast/Multicast IP/MAC address, Data Subkey:=(S-NSSAI and DNN) or MBS Session ID, data set:=MBS Service data, SUPI's.

In the foregoing embodiments, when Data Key:=Broadcast/Multicast IP/MAC address, Data Subkey:=(S-NSSAI and DNN), or Data Subkey:=MBS session ID. In other embodiments of this application, Data Key may also be set to MBS session ID, and in this case, Data Subkey:=(S-NSSAI and DNN).

In an embodiment of this application, before transmitting a DM creation/update request to the MBS UDR, the NEF needs to query, according to the multicast/broadcast address, identifier information of a network slice, and the data network name included in the MBS service creation/update request, the MBS UDR for a subscription permanent identifier subscribed to a relevant MBS service, to obtain SUPI's.

SUPI's included in the DM creation/update request are an optional parameter. Specifically, when before transmitting the DM creation/update request to the MBS UDR, the NEF has found SUPI's subscribed to the relevant MBS service by querying the MBS UDR and has also notified the MBS UDR of the SUPI's through signaling, then the DM creation/update request transmitted by the NEF to the MBS UDR may also not include the SUPI's.

In an embodiment of this application, before transmitting a DM creation/update request to the MBS UDR, the NEF needs to query the NRF according to the multicast/broadcast address, identifier information of a network slice, and the data network name included in the MBS service creation/update request, to obtain a corresponding MBS UDR identifier, and then, transmit the DM creation/update request to the MBS UDR based on the MBS UDR identifier.

S1406: The MBS UDR feeds back a DM creation/update response to the NEF.

In an embodiment of this application, the DM creation/update response fed back by the MBS UDR to the NEF may be Nudr_DMCreate/Update Response( ) 51407: The NEF transmits an MBS service creation/update response to the MBS AF.

In an embodiment of this application, the MBS service creation/update response transmitted by the NEF to the MBS AF may be Nnef_MBSServiceCreate/Update Response( ).

S1408: The MBS UDR transmits a DM notification request to the PCF.

In an embodiment of this application, the DM notification request transmitted by the MBS UDR to the PCF may be Nudr_DMNotify Request (Data Set ID:=UE Policy; Data Subset ID:=MBS Service data; data set:=MBS Service data, Data Key:=*).

In an embodiment of this application, the DM notification request transmitted by the MBS UDR to the PCF may include a parameter list. Each group of parameters in the parameter list includes, as stated above: Data Set ID:=UE Policy; Data Subset ID:=MBS Service data; data set:=MBS Service data, Data Key:=*.

Only when determining that the SUPI (or the SUPI notified in advance) included in the DM subscription request belongs to the SUPI's (or the SUPI's notified in advance) included in the DM creation/update request, the MBS UDR transmits a DM notification request to the PCF. In addition, Data Key:=* indicates that the network address of the multicast/broadcast service is not specified and is optional.

S1409: The PCF transmits a DM notification response to the MBS UDR.

In an embodiment of this application, the DM notification response transmitted by the PCF to the MBS UDR may be Nudr_DMNotify Response( ).

S1410: The PCF transmits an information transfer request to the AMF.

In an embodiment of this application, the information transfer request sent by the PCF to the AMF may be Namf_Communication_N1N2MessageTransfer Request (PCF ID, N1Message (Manage UE Policy Command (MBS Service Data, Multicast/Broadcast IP/MAC Address, S-NSSAI+DNN))).

When MBS Session ID can represent a multicast/broadcast address, Broadcast/Multicast IP/MAC address in the information transfer request transmitted by the PCF to the AMF may also be replaced with MBS Session ID.

S1411: The AMF transmits a downlink non-access stratum transport message to the UE.

In an embodiment of this application, the downlink non-access stratum transport message transmitted by the AMF to the UE may be a DL NAS Transport (N1 Message (Manage UE Policy Command (MBS Service Data, Multicast/Broadcast IP/MAC address, S-NSSAI+DNN)).

Similarly, when MBS Session ID can represent a multicast/broadcast address, Broadcast/Multicast IP/MAC address in DL NAS Transport transmitted by the AMF to the UE may also be replaced with MBS Session ID.

S1412: The UE transmits an uplink non-access stratum transport message to the AMF.

In an embodiment of this application, the uplink non-access stratum transport message transmitted by the UE to the AMF may be UL NAS Transport (N1 Message (Manage UE Policy Complete( ).

S1413: The AMF transmits an information transfer response to the PCF.

In an embodiment of this application, the information transfer response transmitted by the AMF to the PCF may be Namf_Communication_N1N2MessageTransfer Response (N1Message(Manage UE Policy Complete( ))).

S1414: The UE joins an MBS service according to a received UE policy of the MBS service.

Specifically, the UE may select a group of parameters from a plurality of groups of parameters in the received UE Policy of the MBS service, and join, according to a start time of the MBS service included in the selected parameters, the MBS session for multicast or broadcast communication before the start time of the MBS service. When a current time has exceeded the start time of the MBS service, the UE joins the MBS session corresponding to the selected parameters immediately for multicast or broadcast communication.

S1415: Activate an MBS service session, and establish an MBS Quality of Service (QoS) flow.

the biggest difference between the technical solution of the embodiment shown in FIG. 14 and the technical solution of the embodiment shown in FIG. 13 is that the sequence of steps has changed, which mainly lies in that the MBS AF may create or update the MBS service data only after the UE registers with the 5G network.

In the technical solutions of the embodiments shown in FIG. 13 and FIG. 14, the MBS service data can be transmitted by using the UE policy. Specifically, as indicated by the underlined information in Table 1, new UE policy content may be added for MBS Service data in Data Key defined in the standard. In addition, Data Key:=Multicast/Broadcast IP address (for IP services) or Multicast/Broadcast MAC address (for Ethernet communication services). Data Sub Key:=S-NSSAI (+DNN), that is, DNN is the second Sub Key. Data Subset:=MBS Service Data, where MBS service data may be defined in the XML format already specified in the standard, or may be defined in a novel format, such as JSON or YANG, in 5G.

TABLE 1

| Data set (Data Set) | Data subset (Data Subset) | Data keyword (Data Key) | Data sub-keyword (Data Sub Key) |
| --- | --- | --- | --- |
| Subscription data | Access and mobility subscription data | SUPI | Serving PLMN ID and optional NID |
| | SMF selection subscription data | SUPI | Serving PLMN ID and optional NID |
| | UE context in SMF data | SUPI | PDU session ID or DNN |
| | SMS management subscription data | SUPI | Serving PLMN ID and optional NID |
| | SMS subscription data | SUPI | Serving PLMN ID and optional NID |
| | Session management subscription data | SUPI | S-NSSAI DNN Serving PLMN ID and optional NID |
| | Slice selection subscription data | SUPI | Serving PLMN ID and optional NID |
| | Group data | Internal group identifier and external group identification code | — |
| | Identifier translation | GPSI SUPI | Application port ID |
| | Intersystem continuity context | SUPI | DNN |
| | LCS privacy | SUPI | — |
| | LCS mobile origination | SUPI | — |
| | UE reachability | SUPI | — |
| | Group identifier translation | Internal group identifier and external group identification code | — |
| | UE context in AMF data | SUPI | — |
| | UE context in SMSF data | SUPI | — |
| | V2X subscription data | SUPI | — |

TABLE 1-continued

| Data set (Data Set) | Data subset (Data Subset) | Data keyword (Data Key) | Data sub-keyword (Data Sub Key) |
|---|---|---|---|
| Application data | Data packet flow description | Application ID | — |
| | AF transmission impact request information | AF-transaction internal ID S-NSSAI and DNN and/or internal group identifier or SUPI | |
| | Background data transfer (NOTE 3) | Internal group identifier or SUPI | |
| | Service specific information | S-NSSAI and DNN or internal group identifier or SUPI | |
| Policy data | UE context policy control data | SUPI | |
| | PDU session policy control data | SUPI | S-NSSAI DNN |
| | Policy set entry data | SUPI (for UDR in HPLMN) PLMN ID (for UDR in VPLMN) | |
| | Remaining allowable usage data | SUPI | S-NSSAI DNN |
| | Donated data connection configuration file | Donor identity | |
| | Background data transfer data | Background data transfer reference ID (NOTE 2) None (NOTE 1) | |
| | MBS service data | Multicast/Broadcast IP address (for IP service) | S-NSSAI |
| | | Multicast/Broadcast MAC address (for Ethernet service) | DNN |
| Open data | Access and mobility information | SUPI or GPSI | PDU session ID or |
| | Session management information | SUPI or GPSI | UE IP address or DNN |

(NOTE 1):
A data subset is needed for retrieving stored background data transfer references of all ASP identifiers in the UDR, but a data key or a data sub-key is not needed.
(NOTE 2):
Updating a background data transfer reference in the UDR requires to use a data key and use the background data transfer reference as input data.
(NOTE 3):
Background data transfer includes a background data reference ID and an ASP ID, and the ASP ID requires to apply background data reference ID to UE. In addition, the background data transfer includes relevant information received from the AF and defined in Section 6.1.2.4 of TS 23.503 [20].

In addition, in an embodiment of this application, in addition to Nnef_MBSServiceCreate/Update Request/Response, new service messages of the NEF further include Nnef_MBSServiceDelete/Get Request/Response.

The Nnef_MBSServiceCreate Request message means that the MBS AF transmits an MBS service message to the NEF for the first time. The Nnef_MBSServiceUpdate Request message refers to transmitting an updated MBS service message. The Nnef_MBSServiceDelete Request message refers to deleting an MBS service message (in this case, an MBS service is canceled). The Nnef_MBSServiceGet Request message means that the AF obtains an MBS service message in a 5G network from the NEF. The Nnef_MBSServiceCreate/Update/Delete/Get Request message triggers the Nudr_DMCreate/Update/Delete/Get Request message in the foregoing embodiments.

In the technical solutions of the foregoing embodiments of this application, notification of information about an MBS service is performed based on a UE policy, so that the MBS service information can be transmitted to UE in a standardized mode, thereby reducing development costs and testing costs of the UE. In addition, it only needs to slightly modify the data structure of the MBS UDR, and it only needs to slightly enhance the function of the NEF.

The following introduces the apparatus embodiment of this application, which can be used for performing the communication method for an MBS in the foregoing embodiments of this application. For details not disclosed in the apparatus embodiment of this application, reference may be made to the foregoing embodiments of the communication method for an MBS in this application.

Figure 15:
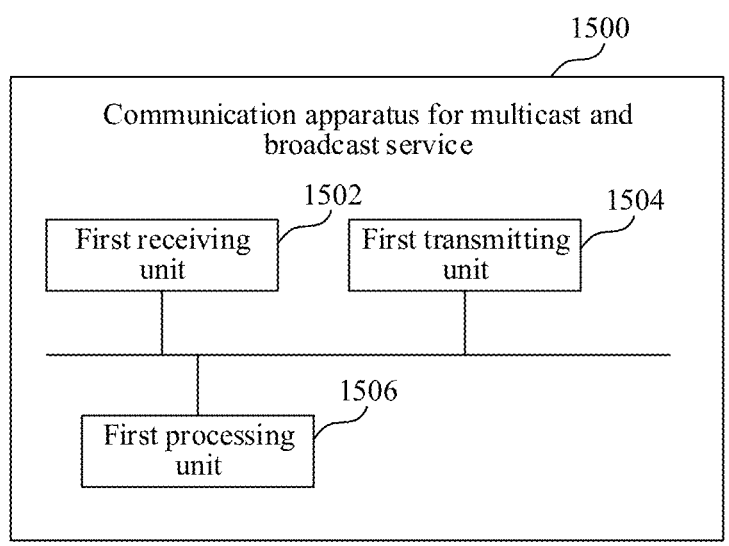
FIG. 15 is a block diagram 1 of a communication apparatus for an MBS according to an embodiment of this application.

FIG. 15 is a block diagram of a communication apparatus for an MBS according to an embodiment of this application. The communication apparatus for an MBS may arranged in an MBS UDR.

Referring to FIG. 15, a communication apparatus 1500 for an MBS according to an embodiment of this application includes: a first receiving unit 1502, a first transmitting unit 1504, and a first processing unit 1506.

The first receiving unit 1502 is configured to receive a DM creation/update request transmitted by a NEF, the DM creation/update request including a data set identifier used for indicating a UE policy, a data subset identifier used for indicating that a data type is an MBS service, a data keyword used for indicating a multicast/broadcast address, a data sub-keyword used for indicating network slice information and a data network name or used for indicating an MBS session identifier, and a data set used for indicating MBS service data, and the DM creation/update request being transmitted by the NEF after an MBS service creation/update request transmitted by an AF is received. The first transmitting unit 1504 is configured to transmit a DM creation/update response to the NEF based on the DM creation/update request. The first processing unit 1506 is configured to transmit, after receiving a DM subscription request transmitted by a PCF and returning a DM subscription response to the PCF, a DM notification request to the PCF, the DM notification request including a data set identifier used for indicating a UE policy, a data subset identifier used for indicating that a data type is an MBS service, a data set used for indicating MBS service data, a data keyword used for indicating a multicast/broadcast address, a data sub-keyword used for indicating network slice information and a data network name, and the DM notification request being used for causing the PCF to transmit, to UE, UE policy information of which a UE policy type is an MBS service.

In some embodiments of this application, based on the foregoing solutions, the first receiving unit 1502 is further configured to: receive, after the DM creation/update response is transmitted to the NEF, the DM subscription request transmitted by the PCF, the DM subscription request including a subscription permanent identifier, a data set identifier used for indicating a UE policy, a data subset identifier used for indicating that a data type is an MBS service, a notification target address, and a notification correlation identifier, and the DM subscription request being transmitted by the PCF after it is detected that the UE registers with a network. The first transmitting unit 1504 is further configured to: return the DM subscription response to the PCF based on the DM subscription request.

In some embodiments of this application, based on the foregoing solutions, the DM creation/update request further includes a set of subscription permanent identifiers participating in MBS communication, and the first transmitting unit 1504 is configured to: return, when the subscription permanent identifier included in the DM subscription request belongs to the set of subscription permanent identifiers, the DM subscription response including a subscription success message to the PCF.

In some embodiments of this application, based on the foregoing solutions, the first receiving unit 1502 is further configured to: receive, before receiving the DM creation/update request by the NEF, the DM subscription request transmitted by the PCF, the DM subscription request including a subscription permanent identifier, a data set identifier used for indicating a UE policy, a data subset identifier used for indicating that a data type is an MBS service, a notification target address, and a notification correlation identifier, and the DM subscription request being transmitted by the PCF after it is detected that the UE registers with a network. The first transmitting unit 1504 is further configured to return the DM subscription response to the PCF.

In some embodiments of this application, based on the foregoing solutions, the first receiving unit 1502 is further configured to: receive a DM deletion request transmitted by the NEF, the DM deletion request including a data set identifier used for indicating a UE policy, a data subset identifier used for indicating that a data type is an MBS service, a data keyword used for indicating a multicast/broadcast address, and a data sub-keyword used for indicating network slice information and a data network name or used for indicating a MBS session identifier. The first processing unit 1506 is further configured to: delete, based on the DM deletion request, the UE policy indicated by the data set identifier, and returning a DM deletion response to the NEF.

In some embodiments of this application, based on the foregoing solutions, the first receiving unit 1502 is further configured to: receive a DM obtaining request transmitted by the NEF, the DM obtaining request including a data set identifier used for indicating a UE policy, a data subset identifier used for indicating that a data type is an MBS service, a data keyword used for indicating a multicast/broadcast address, and a data sub-keyword used for indicating network slice information and a data network name or used for indicating an MBS session identifier. The first processing unit 1506 is further configured to: obtain the MBS service data based on the DM obtaining request, and returning a DM obtaining response to the NEF, the DM obtaining response including the MBS service data.

In some embodiments of this application, based on the foregoing solutions, the DM creation/update request includes a first parameter list, the first parameter list including a plurality of groups of parameters, each group of parameters corresponding to one MBS service and including a data set identifier used for indicating a UE policy, a data subset identifier used for indicating that a data type is an MBS service, a data keyword used for indicating a multicast/broadcast address, a data sub-keyword used for indicating network slice information and a data network name or used for indicating an MBS session identifier, a data set used for indicating MBS service data, and a set of subscription permanent identifiers participating in MBS communication. The DM notification request includes a second parameter list, the second parameter list including a plurality of groups of parameters, each group of parameters including a data set identifier used for indicating a UE policy, a data subset identifier used for indicating that a data type is an MBS service, a data set used for indicating MBS service data, a data keyword used for indicating a multicast/broadcast address, and a data sub-keyword used for indicating network slice information and a data network name.

Figure 16:
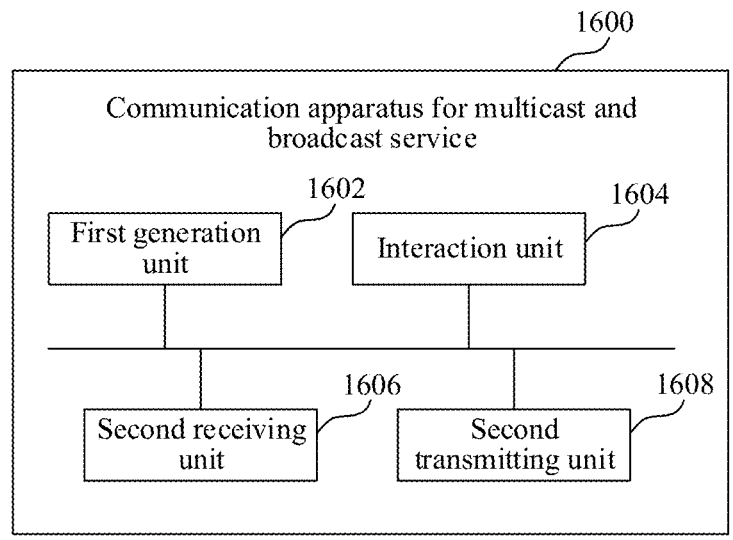
FIG. 16 is a block diagram 2 of a communication apparatus for an MBS according to an embodiment of this application.

FIG. 16 is a block diagram of a communication apparatus for an MBS according to an embodiment of this application. The communication apparatus for an MBS may arranged in a PCF.

Referring to FIG. 16, a communication apparatus 1600 for an MBS according to an embodiment of this application includes: a first generation unit 1602, an interaction unit 1604, a second receiving unit 1606, and a second transmitting unit 1608.

The first generation unit 1602 is configured to generate a DM subscription request, the DM subscription request including a subscription permanent identifier, a data set identifier used for indicating a UE policy, a data subset identifier used for indicating that a data type is an MBS service, a notification target address, and a notification correlation identifier. The interaction unit 1604 is configured to transmit, after it is detected that UE registers with a network, the DM subscription request to an MBS UDR, and receive a DM subscription response fed back by the MBS UDR. The second receiving unit 1606 is configured to receive, after receiving the DM subscription response fed back by the MBS UDR, a DM notification request transmitted by the MBS UDR, the DM notification request including a data set identifier used for indicating a UE policy, a data subset identifier used for indicating that a data type is an MBS service, a data set used for indicating MBS service data, a data keyword used for indicating a multicast/broadcast address, and a data sub-keyword used for indicating network slice information and a data network name or used for indicating an MBS session identifier. The second transmitting unit 1608 is configured to transmit, to UE according to the DM notification request, UE policy information of which a UE policy type is an MBS service.

In some embodiments of this application, based on the foregoing solutions, the second transmitting unit 1608 is further configured to: generate an information transfer request, the information transfer request including a PCF identifier and a UE policy management instruction, a UE policy type included in the UE policy management instruction being an MBS service, and a UE policy included in the UE policy management instruction including MBS service data, a multicast/broadcast address, network slice information, and a data network name; and transmit the information transfer request to an AMF, to cause the AMF to transmit the UE policy management instruction to the UE through a non-access stratum.

In some embodiments of this application, based on the foregoing solutions, the UE policy included in the UE policy management instruction includes a plurality of groups of parameters. Each group of parameters corresponds to one MBS service and includes MBS service data, a multicast/broadcast address, network slice information, and a data network name.

In some embodiments of this application, based on the foregoing solutions, the second receiving unit 1606 is further configured to: receive, after transmitting the information transfer request to the AMF, an information transfer response transmitted by the AMF, the information transfer response including a UE management completion message.

In some embodiments of this application, based on the foregoing solutions, the communication apparatus 1600 for an MBS further includes: a first querying unit, configured to query an NRF for identifier information of the MBS UDR according to a multicast/broadcast address and an MBS session identifier included in subscription data of the UE or according to a multicast/broadcast address, network slice information, and a data network name included in the subscription data.

In some embodiments of this application, based on the foregoing solutions, the DM subscription request includes a third parameter list. The third parameter list includes a plurality of groups of parameters. Each group of parameters includes a subscription permanent identifier, a data set identifier used for indicating a UE policy, a data subset identifier used for indicating that a data type is an MBS service, a notification target address, and a notification correlation identifier.

Figure 17:
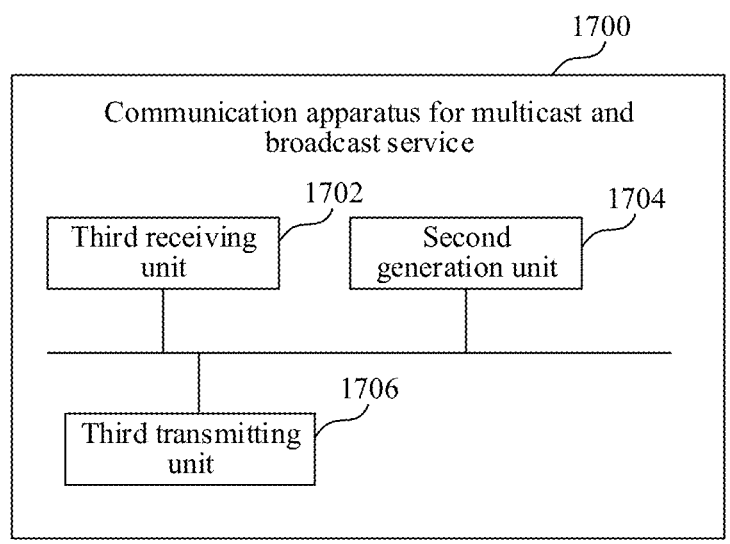
FIG. 17 is a block diagram 3 of a communication apparatus for an MBS according to an embodiment of this application.

FIG. 17 is a block diagram of a communication apparatus for an MBS according to an embodiment of this application. The communication apparatus for an MBS may arranged in a NEF.

Referring to FIG. 17, a communication apparatus 1700 for an MBS according to an embodiment of this application includes: a third receiving unit 1702, a second generation unit 1704, and a third transmitting unit 1706.

The third receiving unit 1702 is configured to receive an MBS service creation/update request transmitted by an AF, the MBS service creation/update request including a multicast/broadcast address, network slice information, a data network name, and MBS service data. The second generation unit 1704 is configured to generate a DM creation/update request, the DM creation/update request including a data set identifier used for indicating a UE policy, a data subset identifier used for indicating that a data type is an MBS service, a data keyword used for indicating a multicast/broadcast address, a data sub-keyword used for indicating network slice information and a data network name or used for indicating an MBS session identifier, and a data set used for indicating MBS service data. The third transmitting unit 1706 is configured to transmit the DM creation/update request to an MBS UDR, and return an MBS service creation/update response to the AF.

In some embodiments of this application, based on the foregoing solutions, the MBS service creation/update request includes a fourth parameter list. The fourth parameter list includes a plurality of groups of parameters. Each group of parameters corresponds to one MBS service and includes a multicast/broadcast address, network slice information, a data network name, and MBS service data. The DM creation/update request includes a first parameter list, the first parameter list including a plurality of groups of parameters, each group of parameters corresponding to one MBS service and including a data set identifier used for indicating a UE policy, a data subset identifier used for indicating that a data type is an MBS service, a data keyword used for indicating a multicast/broadcast address, a data sub-keyword used for indicating network slice information and a data network name or used for indicating an MBS session identifier, a data set used for indicating MBS service data, and a set of subscription permanent identifiers participating in MBS communication.

In some embodiments of this application, based on the foregoing solutions, the third receiving unit 1702 is further configured to: receive an MBS service deletion request transmitted by the AF, the MBS service deletion request including a multicast/broadcast address, network slice information, and a data network name. The second generation unit 1704 is further configured to: generate a DM deletion request based on the MBS service deletion request, the DM deletion request including a data set identifier used for indicating a UE policy, a data subset identifier used for indicating that a data type is an MBS service, a data keyword used for indicating a multicast/broadcast address, and a data sub-keyword used for indicating network slice information and a data network name or used for indicating a MBS session identifier. The third transmitting unit 1706 is further configured to: transmit the DM deletion request to the MBS UDR, the DM deletion request being used for requesting to delete the UE policy indicated by the data set identifier.

In some embodiments of this application, based on the foregoing solutions, the third receiving unit 1702 is further configured to: receive an MBS service obtaining request transmitted by the AF, the MBS service obtaining request including a multicast/broadcast address, network slice information, and a data network name. The second generation unit 1704 is further configured to: generate a DM obtaining request based on the MBS service obtaining request, the DM obtaining request including a data set identifier used for indicating a UE policy, a data subset identifier used for indicating that a data type is an MBS service, a data keyword used for indicating a multicast/broadcast address, and a data sub-keyword used for indicating network slice information and a data network name or used for indicating a MBS session identifier. The third transmitting unit 1706 is further configured to: transmit the DM obtaining request to the MBS UDR, the DM obtaining request being used for requesting to obtain the MBS service data; and return an MBS service obtaining response to the AF, the MBS service obtaining response including the MBS service data.

In some embodiments of this application, based on the foregoing solutions, the communication apparatus 1700 for an MBS further includes: a second querying unit, configured to query an NRF for identifier information of the MBS UDR according to the multicast/broadcast address and the MBS session identifier or according to the multicast/broadcast address, the network slice information, and the data network name.

In some embodiments of this application, based on the foregoing solutions, the communication apparatus 1700 further includes: a querying unit, configured to: before the DM creation/update request is generated, query, according to the multicast/broadcast address, identifier information of a network slice, and the data network name included in the MBS service creation/update request, the MBS UDR for a subscription permanent identifier subscribed to a relevant MBS service, to obtain a set of subscription permanent identifiers.

Figure 18:
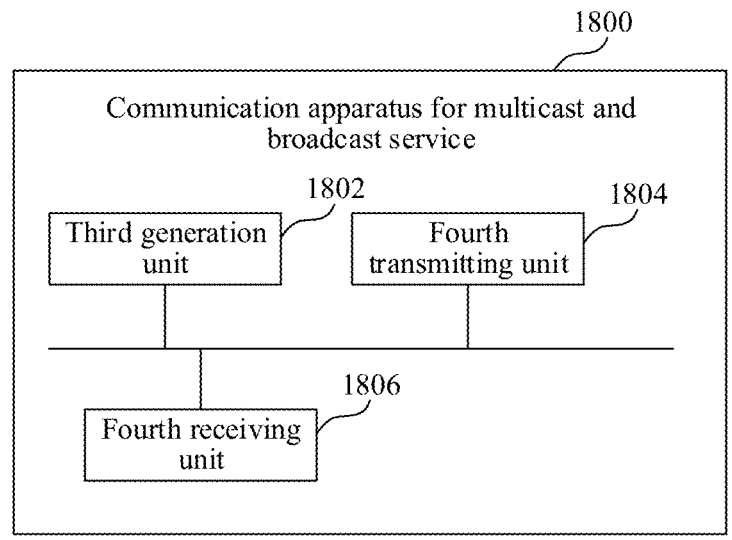
FIG. 18 is a block diagram 4 of a communication apparatus for an MBS according to an embodiment of this application.

FIG. 18 is a block diagram of a communication apparatus for an MBS according to an embodiment of this application. The communication apparatus for an MBS may arranged in an AF.

Referring to FIG. 18, a communication apparatus 1800 for an MBS according to an embodiment of this application includes: a third generation unit 1802, a fourth transmitting unit 1804, and a fourth receiving unit 1806.

The third generation unit 1802 is configured to generate an MBS service creation/update request, the MBS service creation/update request including a multicast/broadcast address, network slice information, a data network name, and MBS service data. The fourth transmitting unit 1804 is configured to transmit the MBS service creation/update request to a NEF, the MBS service creation/update request being used for triggering the NEF to transmit a DM creation/update request to an MBS UDR, the DM creation/update request including a data set identifier used for indicating a UE policy, a data subset identifier used for indicating that a data type is an MBS service, a data keyword used for indicating a multicast/broadcast address, a data sub-keyword used for indicating network slice information and a data network name or used for indicating an MBS session identifier, a data set used for indicating MBS service data, and a set of subscription permanent identifiers participating in MBS communication. The fourth receiving unit 1806 is configured to receive an MBS service creation/update response fed back by the NEF, the MBS service creation/update response being transmitted by the NEF after a DM creation/update response fed back by the MBS UDR is received.

In some embodiments of this application, based on the foregoing solutions, the MBS service creation/update request includes a fourth parameter list. The fourth parameter list includes a plurality of groups of parameters. Each group of parameters corresponds to one MBS service and includes a multicast/broadcast address, network slice information, a data network name, and MBS service data.

In some embodiments of this application, based on the foregoing solutions, the third generation unit 1802 is further configured to: generate an MBS service deletion request, the MBS service deletion request including a multicast/broadcast address, network slice information, and a data network name. The fourth transmitting unit 1804 is further configured to: transmit the MBS service deletion request to the NEF, the MBS service deletion request being used for triggering the NEF to transmit a DM deletion request to the MBS UDR, the DM deletion request including a data set identifier used for indicating a UE policy, a data subset identifier used for indicating that a data type is an MBS service, a data keyword used for indicating a multicast/broadcast address, and a data sub-keyword used for indicating network slice information and a data network name or used for indicating a MBS session identifier. The fourth receiving unit 1806 is further configured to: receive an MBS service deletion response fed back by the NEF, the MBS service deletion response being transmitted by the NEF after a DM deletion response fed back by the MBS UDR is received.

In some embodiments of this application, based on the foregoing solutions, the third generation unit 1802 is further configured to: generate an MBS service obtaining request, the MBS service obtaining request including a multicast/broadcast address, network slice information, and a data network name. The fourth transmitting unit 1804 is further configured to: transmit the MBS service obtaining request to the NEF, the MBS service obtaining request being used for triggering the NEF to transmit a DM obtaining request to the MBS UDR, the DM obtaining request including a data set identifier used for indicating a UE policy, a data subset identifier used for indicating that a data type is an MBS service, a data keyword used for indicating a multicast/broadcast address, and a data sub-keyword used for indicating network slice information and a data network name or used for indicating a MBS session identifier. The fourth receiving unit 1806 is further configured to: receive an MBS service obtaining response fed back by the NEF, the MBS service obtaining response being transmitted by the NEF after a DM obtaining response fed back by the MBS UDR is received.

Figure 19:
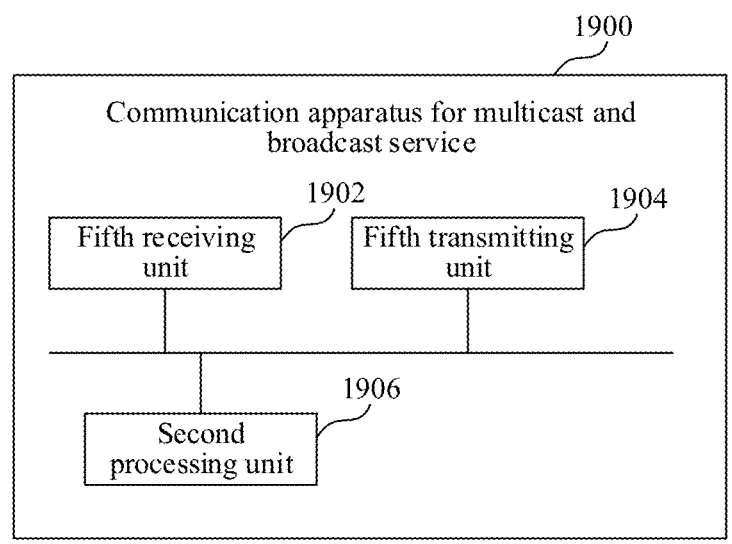
FIG. 19 is a block diagram 5 of a communication apparatus for an MBS according to an embodiment of this application.

FIG. 19 is a block diagram of a communication apparatus for an MBS according to an embodiment of this application. The communication apparatus for an MBS may arranged in a UE.

Referring to FIG. 19, a communication apparatus 1900 for an MBS according to an embodiment of this application includes: a fifth receiving unit 1902, a fifth transmitting unit 1904, and a second processing unit 1906.

The fifth receiving unit 1902 is configured to receive a downlink UE policy management instruction transmitted by a PCF, a UE policy type included in the UE policy management instruction being an MBS service, a UE policy included in the UE policy management instruction including MBS service data, a multicast/broadcast address, network slice information, and a data network name, the downlink UE policy management instruction being transmitted by the PCF to an AMF and being transmitted by the AMF to UE through a downlink non-access stratum transport message. The fifth transmitting unit 1904 is configured to transmit uplink UE policy management completion information to the PCF, the uplink UE policy management completion information being transmitted by the UE to the AMF through an uplink non-access stratum transport message and being transmitted by the AMF to the PCF. The second processing unit 1906 is configured to join, according to information included in the UE policy management instruction, a corresponding MBS session for multicast/broadcast communication.

In some embodiments of this application, based on the foregoing solutions, the UE policy included in the UE policy management instruction includes a plurality of groups of parameters. Each group of parameters corresponds to one MBS service and includes MBS service data, a multicast/broadcast address, network slice information, and a data network name. The second processing unit 1906 is configured to: select at least one group of parameters from the plurality of groups of parameters, and join, according to a start time of an MBS service included in the selected parameters, an MBS session corresponding to the selected parameters for multicast/broadcast communication before the start time of the MBS service.

In some embodiments of this application, based on the foregoing solutions, the second processing unit 1906 is further configured to: join, when a current time has exceeded the start time of the MBS service, the MBS session corresponding to the selected parameters immediately for multicast/broadcast communication.

Figure 20:
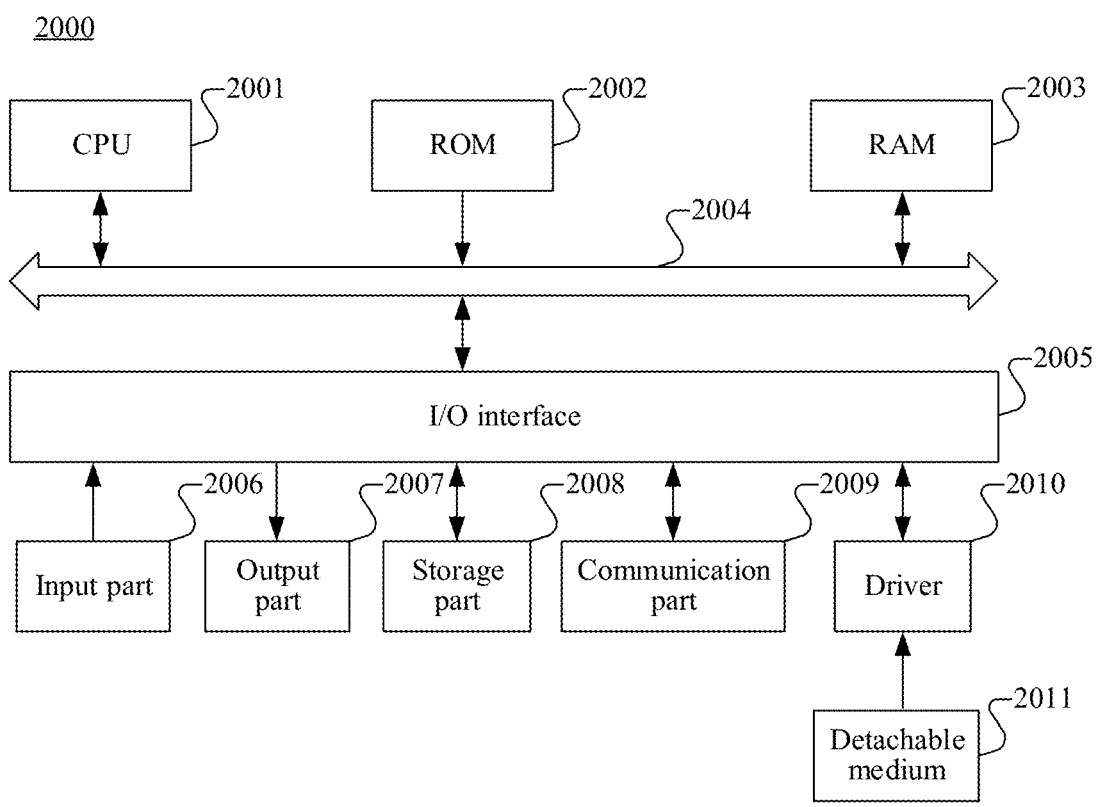
FIG. 20 is a schematic structural diagram of a computer system adapted to implement an electronic device according to an embodiment of this application.

FIG. 20 is a schematic structural diagram of a computer system adapted to implement an electronic device according to an embodiment of this application.

The computer system 2000 of the electronic device shown in FIG. 20 is merely an example, and does not constitute any limitation on functions and use ranges of the embodiments of this application.

As shown in FIG. 20, the computer system 2000 includes a central processing unit (CPU) 2001 that can perform various appropriate actions and processes, for example, perform the methods described in the foregoing embodiments, according to a program stored in a read-only memory (ROM) 2002 or a program loaded into a random access memory (RAM) 2003 from a storage part 2008. The RAM 2003 further stores various programs and data required for operating the system. The CPU 2001, the ROM 2002, and the RAM 2003 are connected to each other through a bus 2004. An input/output (I/O) interface 2005 is also connected to the bus 2004.

The following components are connected to the I/O interface 2005: an input part 2006 including a keyboard, a mouse, or the like; an output part 2007 including a cathode ray tube (CRT), a liquid crystal display (LCD), a speaker, or the like; a storage part 2008 including hard disk, or the like; and a communication part 2009 including a network interface card such as a local area network (LAN) card, a modem, or the like. The communication part 2009 performs communication processing by using a network such as the Internet. A driver 2010 is also connected to the I/O interface 2005 as required. A removable medium 2011, such as a magnetic disk, an optical disc, a magneto-optical disk, or a semiconductor memory, is installed on the driver 2010 as required, so that a computer program read from the removable medium is installed into the storage part 2008 as required.

Particularly, according to an embodiment of this application, the processes described in the following by referring to the flowcharts may be implemented as computer software programs. For example, an embodiment of this application includes a computer program product. The computer program product includes a computer program stored in a computer-readable medium. The computer program includes a computer program used for performing a method shown in the flowchart. In such an embodiment, the computer program may be downloaded and installed through the communication part 2009 from a network, and/or installed from the removable medium 2011. When the computer program is executed by the CPU 2001, the various functions defined in the system of this application are executed.

The computer-readable medium shown in the embodiments of this application may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In this application, a computer-readable signal medium may include a data signal in a baseband or propagated as a part of a carrier wave, the data signal carrying a computer-readable computer program. A data signal propagated in such a way may assume a plurality of forms, including, but not limited to, an electromagnetic signal, an optical signal, or any appropriate combination thereof. The computer-readable signal medium may be further any computer readable medium in addition to a computer-readable storage medium. The computer readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of this application. Each box in a flowchart or a block diagram may represent a module, a program segment, or a part of code. The module, the program segment, or the part of code includes one or more executable instructions used for implementing specified logic functions. In some implementations used as substitutes, functions marked in boxes may alternatively occur in a sequence different from that marked in an accompanying drawing. For example, two boxes shown in succession may actually be performed basically in parallel, and sometimes the two boxes may be performed in a reverse sequence. This is determined by a related function. Each box in the block diagram or the flowchart, and a combination of boxes in the block diagram or the flowchart may be implemented by using a dedicated hardware-based system that performs a specified function or operation, or may be implemented by using a combination of dedicated hardware and computer instructions.

A related unit described in the embodiments of this application may be implemented in a software manner, or may be implemented in a hardware manner, and the unit described may also be set in a processor. Names of the units do not constitute a limitation on the units in a specific case.

In another aspect, this application further provides a computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions according to the implementations of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the implementations of this application.

After considering the specification and practicing the disclosed embodiments, a person skilled in the art may easily conceive of other implementations of this application. This application is intended to cover any variations, uses or adaptive changes of this application. Such variations, uses or adaptive changes follow the general principles of this application, and include well-known knowledge and conventional technical means in the art that are not disclosed in this application.

It is to be understood that this application is not limited to the precise structures described above and shown in the accompanying drawings, and various modifications and changes can be made without departing from the scope of this application. The scope of this application is limited by the appended claims only. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the pre-defined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A communication method for a multicast and broadcast service (MBS) performed by an electronic device acting as a unified data repository for an MBS (MBS UDR), the communication method comprising:

receiving a data management (DM) creation request or update request transmitted by a network exposure function (NEF), the DM creation request or update request comprising a data set identifier used for indicating a user equipment policy, a data subset identifier used for indicating that a data type is an MBS service, a data keyword used for indicating a multicast/broadcast address, a data sub-keyword used for indicating network slice information and a data network name or used for indicating an MBS session identifier, and a data set used for indicating MBS service data, and the DM creation request or update request being transmitted by the NEF after an MBS service creation request or update request transmitted by an application function (AF) is received;

transmitting a DM creation response or update response to the NEF based on the DM creation request or update request; and transmitting, after receiving a DM subscription request transmitted by a policy control function (PCF) and returning a DM subscription response to the PCF, a DM notification request to the PCF, the DM notification request comprising a data set identifier used for indicating a user equipment policy, a data subset identifier used for indicating that a data type is an MBS service, a data set used for indicating MBS service data, a data keyword used for indicating a multicast/broadcast address, a data sub-keyword used for indicating network slice information and a data network name, and the DM notification request being used for causing the PCF to transmit, to user equipment, user equipment policy information of which a user equipment policy type is an MBS service.

2. The communication method for an MBS according to claim 1, wherein after the transmitting a DM creation response or update response to the NEF, the communication method further comprises:

receiving the DM subscription request transmitted by the PCF, the DM subscription request comprising a subscription permanent identifier, a data set identifier used for indicating a user equipment policy, a data subset identifier used for indicating that a data type is an MBS service, a notification target address, and a notification correlation identifier, and the DM subscription request being transmitted by the PCF after it is detected that the user equipment registers with a network; and returning the DM subscription response to the PCF based on the DM subscription request.

3. The communication method for an MBS according to claim 2, wherein the DM creation request or update request further comprises a set of subscription permanent identifiers participating in MBS communication, and the returning the DM subscription response to the PCF based on the DM subscription request comprises:

returning, when the subscription permanent identifier comprised in the DM subscription request belongs to the set of subscription permanent identifiers, the DM subscription response comprising a subscription success message to the PCF.

4. The communication method for an MBS according to claim 1, wherein before the receiving a DM creation request or update request transmitted by a NEF, the communication method further comprises:

receiving the DM subscription request transmitted by the PCF, the DM subscription request comprising a subscription permanent identifier, a data set identifier used for indicating a user equipment policy, a data subset identifier used for indicating that a data type is an MBS service, a notification target address, and a notification correlation identifier, and the DM subscription request being transmitted by the PCF after it is detected that the user equipment registers with a network; and returning the DM subscription response to the PCF.

5. The communication method for an MBS according to claim 1, wherein the communication method further comprises:
  receiving a DM deletion request transmitted by the NEF, the DM deletion request comprising a data set identifier used for indicating a user equipment policy, a data subset identifier used for indicating that a data type is an MBS service, a data keyword used for indicating a multicast/broadcast address, and a data sub-keyword used for indicating network slice information and a data network name or used for indicating a MBS session identifier; and
  deleting, based on the DM deletion request, the user equipment policy indicated by the data set identifier, and returning a DM deletion response to the NEF.

6. The communication method for an MBS according to claim 1, wherein the communication method further comprises:
  receiving a DM obtaining request transmitted by the NEF, the DM obtaining request comprising a data set identifier used for indicating a user equipment policy, a data subset identifier used for indicating that a data type is an MBS service, a data keyword used for indicating a multicast/broadcast address, and a data sub-keyword used for indicating network slice information and a data network name or used for indicating an MBS session identifier; and
  obtaining the MBS service data based on the DM obtaining request, and returning a DM obtaining response to the NEF, the DM obtaining response comprising the MBS service data.

7. The communication method for an MBS according to claim 1, wherein the DM creation request or update request comprises a first parameter list, the first parameter list comprising a plurality of groups of parameters, each group of parameters corresponding to one MBS service and comprising a data set identifier used for indicating a user equipment policy, a data subset identifier used for indicating that a data type is an MBS service, a data keyword used for indicating a multicast/broadcast address, a data sub-keyword used for indicating network slice information and a data network name or used for indicating an MBS session identifier, a data set used for indicating MBS service data, and a set of subscription permanent identifiers participating in MBS communication; and
  the DM notification request comprises a second parameter list, the second parameter list comprising a plurality of groups of parameters, each group of parameters comprising a data set identifier used for indicating a user equipment policy, a data subset identifier used for indicating that a data type is an MBS service, a data set used for indicating MBS service data, a data keyword used for indicating a multicast/broadcast address, and a data sub-keyword used for indicating network slice information and a data network name.

8. An electronic device, comprising:
  one or more processors;
  a storage apparatus, configured to store one or more programs, the one or more programs, when executed by the one or more processors, causing the electronic device to implement a communication method for an MBS, the communication method including:
  receiving a data management (DM) creation request or update request transmitted by a network exposure function (NEF), the DM creation request or update request comprising a data set identifier used for indicating a user equipment policy, a data subset identifier used for indicating that a data type is an MBS service, a data keyword used for indicating a multicast/broadcast address, a data sub-keyword used for indicating network slice information and a data network name or used for indicating an MBS session identifier, and a data set used for indicating MBS service data, and the DM creation request or update request being transmitted by the NEF after an MBS service creation request or update request transmitted by an application function (AF) is received;
  transmitting a DM creation response or update response to the NEF based on the DM creation request or update request; and
  transmitting, after receiving a DM subscription request transmitted by a policy control function (PCF) and returning a DM subscription response to the PCF, a DM notification request to the PCF, the DM notification request comprising a data set identifier used for indicating a user equipment policy, a data subset identifier used for indicating that a data type is an MBS service, a data set used for indicating MBS service data, a data keyword used for indicating a multicast/broadcast address, a data sub-keyword used for indicating network slice information and a data network name, and the DM notification request being used for causing the PCF to transmit, to user equipment, user equipment policy information of which a user equipment policy type is an MBS service.

9. The electronic device according to claim 8, wherein after the transmitting a DM creation response or update response to the NEF, the communication method further comprises:
  receiving the DM subscription request transmitted by the PCF, the DM subscription request comprising a subscription permanent identifier, a data set identifier used for indicating a user equipment policy, a data subset identifier used for indicating that a data type is an MBS service, a notification target address, and a notification correlation identifier, and the DM subscription request being transmitted by the PCF after it is detected that the user equipment registers with a network; and
  returning the DM subscription response to the PCF based on the DM subscription request.

10. The electronic device according to claim 9, wherein the DM creation request or update request further comprises a set of subscription permanent identifiers participating in MBS communication, and the returning the DM subscription response to the PCF based on the DM subscription request comprises:
  returning, when the subscription permanent identifier comprised in the DM subscription request belongs to the set of subscription permanent identifiers, the DM subscription response comprising a subscription success message to the PCF.

11. The electronic device according to claim 8, wherein before the receiving a DM creation request or update request transmitted by a NEF, the communication method further comprises:
  receiving the DM subscription request transmitted by the PCF, the DM subscription request comprising a subscription permanent identifier, a data set identifier used for indicating a user equipment policy, a data subset identifier used for indicating that a data type is an MBS service, a notification target address, and a notification correlation identifier, and the DM subscription request being transmitted by the PCF after it is detected that the user equipment registers with a network; and
  returning the DM subscription response to the PCF.

12. The electronic device according to claim 8, wherein the communication method further comprises:
- receiving a DM deletion request transmitted by the NEF, the DM deletion request comprising a data set identifier used for indicating a user equipment policy, a data subset identifier used for indicating that a data type is an MBS service, a data keyword used for indicating a multicast/broadcast address, and a data sub-keyword used for indicating network slice information and a data network name or used for indicating a MBS session identifier; and
- deleting, based on the DM deletion request, the user equipment policy indicated by the data set identifier, and returning a DM deletion response to the NEF.

13. The electronic device according to claim 8, wherein the communication method further comprises:
- receiving a DM obtaining request transmitted by the NEF, the DM obtaining request comprising a data set identifier used for indicating a user equipment policy, a data subset identifier used for indicating that a data type is an MBS service, a data keyword used for indicating a multicast/broadcast address, and a data sub-keyword used for indicating network slice information and a data network name or used for indicating an MBS session identifier; and
- obtaining the MBS service data based on the DM obtaining request, and returning a DM obtaining response to the NEF, the DM obtaining response comprising the MBS service data.

14. The electronic device according to claim 8, wherein the DM creation request or update request comprises a first parameter list, the first parameter list comprising a plurality of groups of parameters, each group of parameters corresponding to one MBS service and comprising a data set identifier used for indicating a user equipment policy, a data subset identifier used for indicating that a data type is an MBS service, a data keyword used for indicating a multicast/broadcast address, a data sub-keyword used for indicating network slice information and a data network name or used for indicating an MBS session identifier, a data set used for indicating MBS service data, and a set of subscription permanent identifiers participating in MBS communication; and
- the DM notification request comprises a second parameter list, the second parameter list comprising a plurality of groups of parameters, each group of parameters comprising a data set identifier used for indicating a user equipment policy, a data subset identifier used for indicating that a data type is an MBS service, a data set used for indicating MBS service data, a data keyword used for indicating a multicast/broadcast address, and a data sub-keyword used for indicating network slice information and a data network name.

15. A non-transitory computer-readable medium, storing one or more computer programs, the computer programs, when executed by a processor of an electronic device, causing the electronic device to implement a communication method for an MBS, the communication method including:
- receiving a data management (DM) creation request or update request transmitted by a network exposure function (NEF), the DM creation request or update request comprising a data set identifier used for indicating a user equipment policy, a data subset identifier used for indicating that a data type is an MBS service, a data keyword used for indicating a multicast/broadcast address, a data sub-keyword used for indicating network slice information and a data network name or used for indicating an MBS session identifier, and a data set used for indicating MBS service data, and the DM creation request or update request being transmitted by the NEF after an MBS service creation request or update request transmitted by an application function (AF) is received;
- transmitting a DM creation response or update response to the NEF based on the DM creation request or update request; and
- transmitting, after receiving a DM subscription request transmitted by a policy control function (PCF) and returning a DM subscription response to the PCF, a DM notification request to the PCF, the DM notification request comprising a data set identifier used for indicating a user equipment policy, a data subset identifier used for indicating that a data type is an MBS service, a data set used for indicating MBS service data, a data keyword used for indicating a multicast/broadcast address, a data sub-keyword used for indicating network slice information and a data network name, and the DM notification request being used for causing the PCF to transmit, to user equipment, user equipment policy information of which a user equipment policy type is an MBS service.

16. The non-transitory computer-readable medium according to claim 15, wherein after the transmitting a DM creation response or update response to the NEF, the communication method further comprises:
- receiving the DM subscription request transmitted by the PCF, the DM subscription request comprising a subscription permanent identifier, a data set identifier used for indicating a user equipment policy, a data subset identifier used for indicating that a data type is an MBS service, a notification target address, and a notification correlation identifier, and the DM subscription request being transmitted by the PCF after it is detected that the user equipment registers with a network; and
- returning the DM subscription response to the PCF based on the DM subscription request.

17. The non-transitory computer-readable medium according to claim 15, wherein before the receiving a DM creation request or update request transmitted by a NEF, the communication method further comprises:
- receiving the DM subscription request transmitted by the PCF, the DM subscription request comprising a subscription permanent identifier, a data set identifier used for indicating a user equipment policy, a data subset identifier used for indicating that a data type is an MBS service, a notification target address, and a notification correlation identifier, and the DM subscription request being transmitted by the PCF after it is detected that the user equipment registers with a network; and
- returning the DM subscription response to the PCF.

18. The non-transitory computer-readable medium according to claim 15, wherein the communication method further comprises:
- receiving a DM deletion request transmitted by the NEF, the DM deletion request comprising a data set identifier used for indicating a user equipment policy, a data subset identifier used for indicating that a data type is an MBS service, a data keyword used for indicating a multicast/broadcast address, and a data sub-keyword used for indicating network slice information and a data network name or used for indicating a MBS session identifier; and deleting, based on the DM deletion request, the user equipment policy indicated by the data set identifier, and returning a DM deletion response to the NEF.

19. The non-transitory computer-readable medium according to claim 15, wherein the communication method further comprises:
receiving a DM obtaining request transmitted by the NEF, the DM obtaining request comprising a data set identifier used for indicating a user equipment policy, a data subset identifier used for indicating that a data type is an MBS service, a data keyword used for indicating a multicast/broadcast address, and a data sub-keyword used for indicating network slice information and a data network name or used for indicating an MBS session identifier; and
obtaining the MBS service data based on the DM obtaining request, and returning a DM obtaining response to the NEF, the DM obtaining response comprising the MBS service data.

20. The non-transitory computer-readable medium according to claim 15, wherein the DM creation request or update request comprises a first parameter list, the first parameter list comprising a plurality of groups of parameters, each group of parameters corresponding to one MBS service and comprising a data set identifier used for indicating a user equipment policy, a data subset identifier used for indicating that a data type is an MBS service, a data keyword used for indicating a multicast/broadcast address, a data sub-keyword used for indicating network slice information and a data network name or used for indicating an MBS session identifier, a data set used for indicating MBS service data, and a set of subscription permanent identifiers participating in MBS communication; and
the DM notification request comprises a second parameter list, the second parameter list comprising a plurality of groups of parameters, each group of parameters comprising a data set identifier used for indicating a user equipment policy, a data subset identifier used for indicating that a data type is an MBS service, a data set used for indicating MBS service data, a data keyword used for indicating a multicast/broadcast address, and a data sub-keyword used for indicating network slice information and a data network name.

* * * * *